United States Patent
Schmidt et al.

(10) Patent No.: US 12,249,057 B2
(45) Date of Patent: Mar. 11, 2025

(54) SYSTEMS AND METHODS FOR CREATING AND/OR ANALYZING THREE-DIMENSIONAL MODELS OF INFRASTRUCTURE ASSETS

(71) Applicant: RoadBotics, Inc., Pittsburgh, PA (US)

(72) Inventors: Benjamin T. Schmidt, Oakmont, PA (US); Miguel Dickson, Pittsburgh, PA (US); Christoph Mertz, Pittsburgh, PA (US); Anshul Goyal, Pittsburgh, PA (US)

(73) Assignee: RoadBotics, Inc., Pittsburgh, PA (US)

( * ) Notice: Subject to any disclaimer, the term of this patent is extended or adjusted under 35 U.S.C. 154(b) by 0 days.

(21) Appl. No.: 18/457,213

(22) Filed: Aug. 28, 2023

(65) Prior Publication Data

US 2024/0127416 A1    Apr. 18, 2024

Related U.S. Application Data

(63) Continuation of application No. 17/925,958, filed as application No. PCT/US2021/032820 on May 17, 2021, now Pat. No. 11,769,238.
(Continued)

(51) Int. Cl.
*G06K 9/00* (2022.01)
*G06T 7/00* (2017.01)
(Continued)

(52) U.S. Cl.
CPC ............. *G06T 7/0002* (2013.01); *G06T 7/20* (2013.01); *G06T 7/90* (2017.01); *G06T 17/00* (2013.01);
(Continued)

(58) Field of Classification Search
CPC ...... G01C 7/02; G01C 21/3602; G01C 11/00; G01C 11/06; G01C 11/04; G01C 21/26;
(Continued)

(56) References Cited

U.S. PATENT DOCUMENTS 6,453,056 B2    9/2002  Laumeyer et al.
6,690,294 B1    2/2004  Zierden
(Continued)

FOREIGN PATENT DOCUMENTS

CN    107092020 A    8/2017
CN    109564619 A    4/2019
(Continued)

OTHER PUBLICATIONS

International Search Report and Written Opinion for International Application No. PCT/US2020/055508, mailed Jan. 21, 2021.
(Continued)

*Primary Examiner* — Duy M Dang
(74) *Attorney, Agent, or Firm* — Wolf, Greenfield & Sacks, P.C.

(57) ABSTRACT

Systems and methods for detecting, geolocating, assessing, and/or inventorying infrastructure assets. In some embodiments, a plurality of images captured by a moving camera may be used to generate a point cloud. A plurality of points corresponding to a pavement surface may be identified from the point cloud. The plurality of points may be used to generate at least one synthetic image of the pavement surface, the at least one synthetic image having at least one selected camera pose. The at least one synthetic image may be used to assess at least one condition of the pavement surface.

24 Claims, 30 Drawing Sheets

Related U.S. Application Data

(60) Provisional application No. 63/026,602, filed on May 18, 2020.

(51) Int. Cl.
    *G06T 7/20*     (2017.01)
    *G06T 7/90*     (2017.01)
    *G06T 17/00*     (2006.01)
    *G06V 20/56*     (2022.01)

(52) U.S. Cl.
    CPC .. *G06V 20/588* (2022.01); *G06T 2207/10016* (2013.01); *G06T 2207/10024* (2013.01); *G06T 2207/10028* (2013.01); *G06T 2207/30184* (2013.01); *G06T 2207/30256* (2013.01); *G06T 2210/56* (2013.01)

(58) Field of Classification Search
    CPC .......... G06N 3/02; G06N 3/045; G06N 3/084; G06T 7/11; G06T 2207/10016; G06T 2207/10024; G06T 2207/20084; G06T 2207/20221; G06V 10/40; G06V 10/58; G06V 10/82; G06V 20/176; G06V 20/50; G06V 20/56; G06V 20/508; G06V 20/588; G06V 20/64; G01D 3/022; G01D 18/008; G01D 18/00; H01L 22/20; F15B 19/00; G06Q 10/06; G01L 27/00
    See application file for complete search history.

(56) References Cited

U.S. PATENT DOCUMENTS

| | | | |
|---|---|---|---|
| 7,697,727 B2 | 5/2010 | Xu et al. | |
| 9,092,981 B2 | 7/2015 | Suzuki et al. | |
| 9,196,048 B2 | 11/2015 | Jahanshahi et al. | |
| 9,916,755 B1 | 3/2018 | Ratti | |
| 10,147,002 B2 | 12/2018 | Hartmann et al. | |
| 10,296,794 B2 | 5/2019 | Ratti | |
| 11,769,238 B2 * | 9/2023 | Schmidt | G06T 17/00 |
| 2003/0202683 A1 | 10/2003 | Ma et al. | |
| 2007/0127774 A1 | 6/2007 | Zhang et al. | |
| 2011/0234749 A1 | 9/2011 | Alon | |
| 2013/0082857 A1 | 4/2013 | Beer et al. | |
| 2013/0216089 A1 | 8/2013 | Chen et al. | |
| 2014/0196529 A1 | 7/2014 | Cronin et al. | |
| 2016/0292518 A1 | 10/2016 | Banitt et al. | |
| 2017/0032402 A1 | 2/2017 | Patsiokas et al. | |
| 2019/0005685 A1 | 1/2019 | Mu | |
| 2020/0334566 A1 | 10/2020 | Vianu et al. | |
| 2023/0196535 A1 | 6/2023 | Schmidt et al. | |

FOREIGN PATENT DOCUMENTS

| | | |
|---|---|---|
| EP | 3 859 279 A1 | 8/2021 |
| WO | WO 2008/032305 A2 | 3/2008 |

OTHER PUBLICATIONS

Third Party Observation for International Application No. PCT/US2020/055508, submitted Feb. 14, 2022.

International Preliminary Report on Patentability for International Application No. PCT/US2020/055508, mailed Apr. 28, 2022.

Invitation to Pay Additional Fees for International Application No. PCT/US2021/032820, mailed Jul. 15, 2021.

International Search Report and Written Opinion for International Application No. PCT/US2021/032820, mailed Oct. 7, 2021.

Third Party Observation for International Application No. PCT/US2021/032820, submitted Sep. 18, 2022.

International Preliminary Report on Patentability for International Application No. PCT/US2021/032820, mailed Dec. 1, 2022.

[No Author Listed] Designation: D 6433-07. Standard practice for roads and parking lots pavement condition index surveys. ASTM International. https://pages.mtu.edu/~balkire/CE5403/ASTMD6433.pdf. Jan. 2008: 1-48.

[No Author Listed] Scale-invariant feature transform. Wikipedia. https://en.wikipedia.org/wiki/Scale-invariant_feature_transform. Downloaded Mar. 12, 2020:1-19.

[No Author Listed] Structure from motion. Wikipedia. https://en.wikipedia.org/wiki/Structure_from_Motion. Downloaded Mar. 12, 2020:1-9.

Berger et al., State of the art in surface reconstruction from point clouds. Eurographics 2014 State of the Art Reports (STAR). Apr. 7, 2014;1(1):161-85.

Bruls et al., Mark yourself: Road marking segmentation via weakly-supervised annotations from multimodal data. 2018 IEEE International Conference on Robotics and Automation (ICRA). May 21-25, 2018:1863-70.

Guan et al., Iterative tensor voting for pavement crack extraction using mobile laser scanning data. IEEE Transactions on Geoscience and Remote Sensing. Sep. 4, 2014;53(3):1527-37.

Kudinov et al., Object extraction from Mobile LiDAR point clouds with Machine Learning. Medium GeoAI. https://medium.com/geoai/object-extraction-from-mobile-lidar-point-clouds-with-machine-learning-cb15fcbb5597. Jan. 27, 2020:1-43.

Li et al., Efficient dense point cloud object reconstruction using deformation vector fields. Proceedings of the European Conference on Computer Vision (ECCV). Sep. 8-14, 2018:497-513.

Mandikal et al., 3d-psrnet: Part segmented 3d point cloud reconstruction from a single image. Proceedings of the European Conference on Computer Vision (ECCV) Workshops Sep. 8-14, 2018:1-13.

Moulon et al., Global fusion of relative motions for robust, accurate and scalable structure from motion. Proceedings of the IEEE International Conference on Computer Vision (ICCV). Dec. 1-8, 2013:3248-55.

Napier, Vision & laser for road based localisation. Robotics Research Group, Department of Engineering Science, University of Oxford. https://www.robots.ox.ac.uk/~mobile/Theses/Napier_Thesis_shrunk.pdf. Jan. 2014:1-190.

Sheehan et al., Continuous vehicle localisation using sparse 3D sensing, kernelised Rényi distance and fast Gauss transforms. 2013 IEEE/RSJ International Conference on Intelligent Robots and Systems (IROS). Nov. 3, 2013:398-405.

Trigilio, Structure from motion (SfM). Humboldt State Geospatial Online GSP 216: Introduction to Remote Sensing. gsp.humboldt.edu/OLM/Courses/GSP_216_Online/lesson8-2/SfM.html. Dated 2017; Downloaded Mar. 12, 2020:1-6.

Yuan et al., Robust lane detection for complicated road environment based on normal map. IEEE Access. Sep. 6, 2018;6:49679-89.

Zhou et al., Detail preserved surface reconstruction from point cloud. Sensors. Mar. 13, 2019;19(6):1278.

Abou Charcra et al., Fully Automated Road Defect Detection Using Street View Images. IEEE, 14th Conference on Computer and Robot Vision, 2017:353-60.

Angulo et al., Road Damage Detection Acquisition System based on Deep Neural Networks for Physical Asset Management. Sep. 2019;1-15.

Wu et al., Coupling Deep Learning and UAV for Infrastructure Condition Assessment Automation. IEEE international smart cities conference (ISC2) Sep. 16, 2018:1-7.

\* cited by examiner

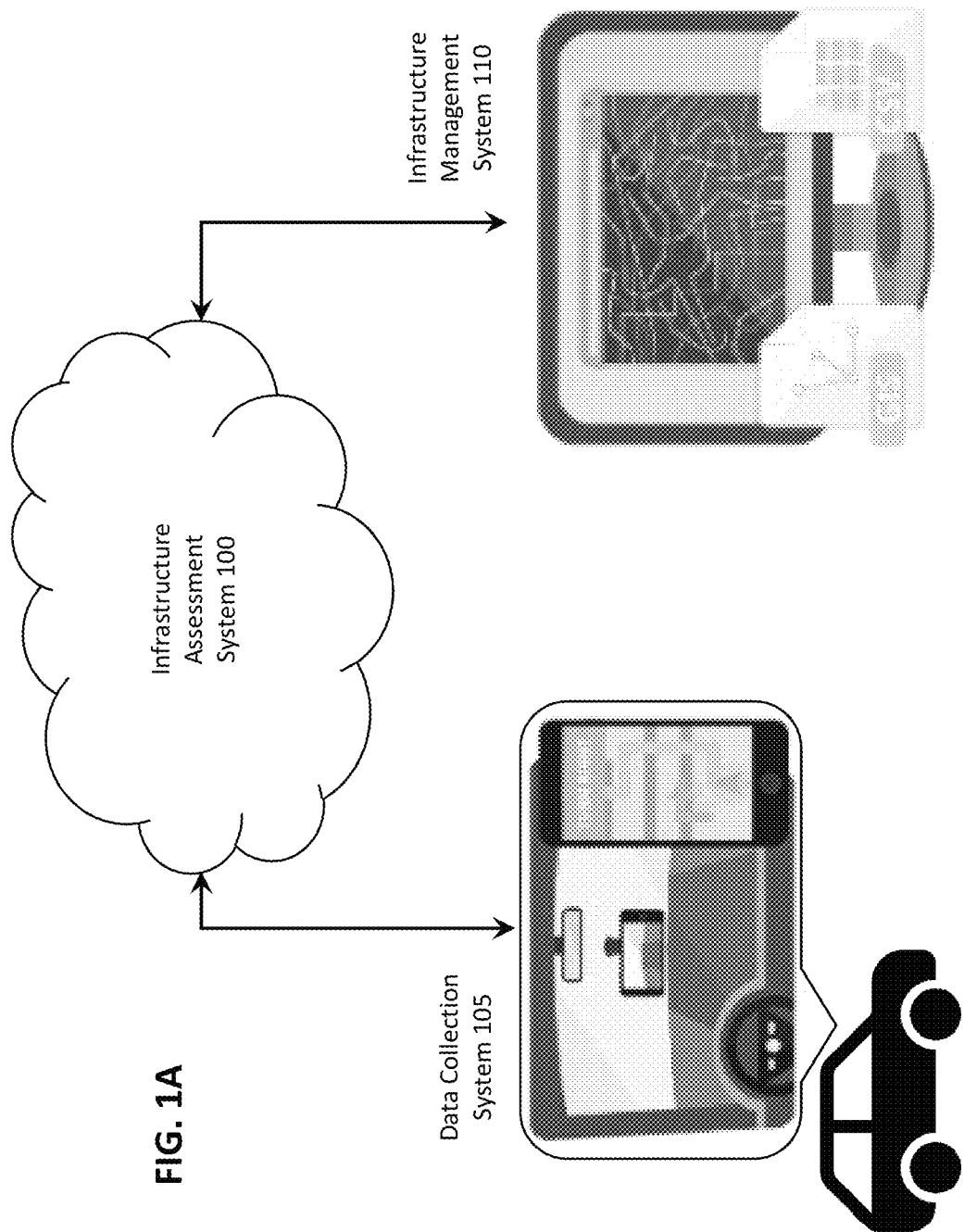

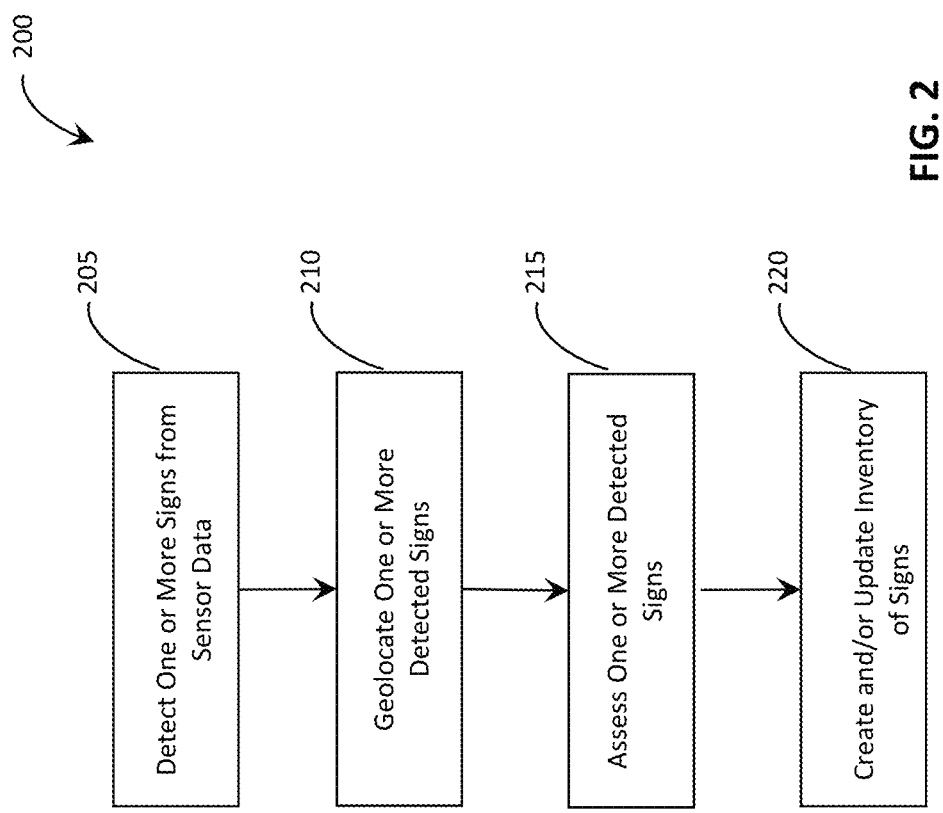

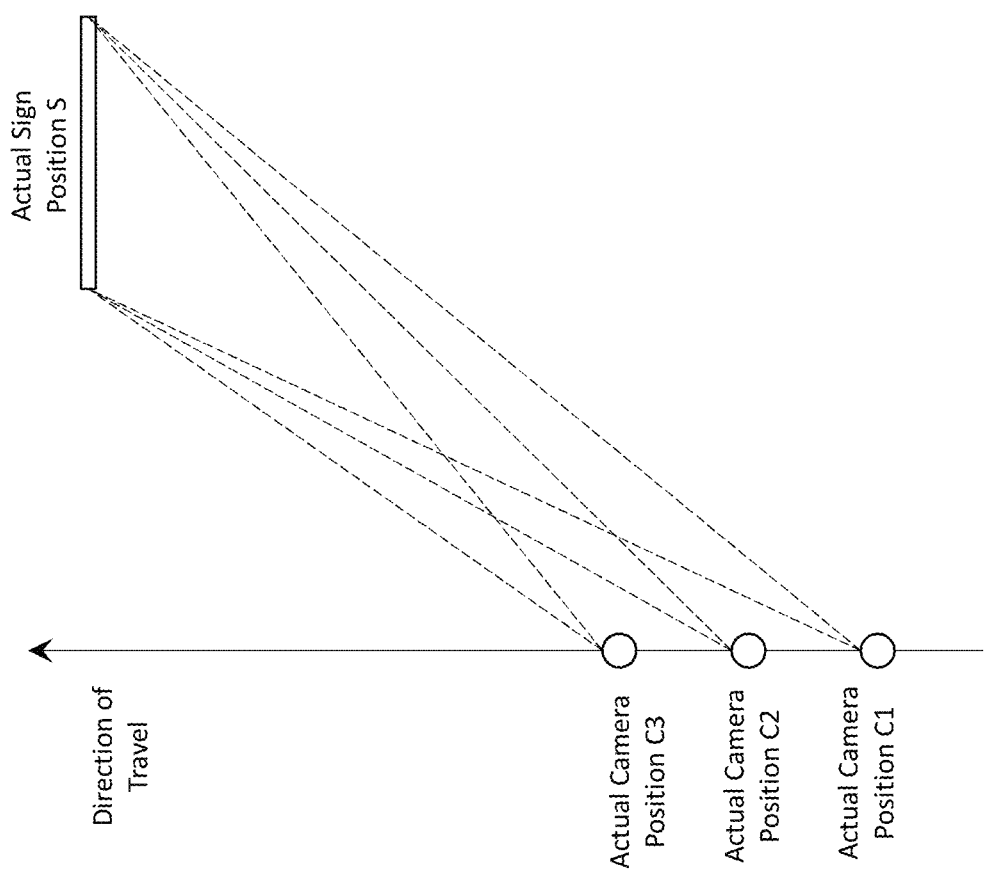

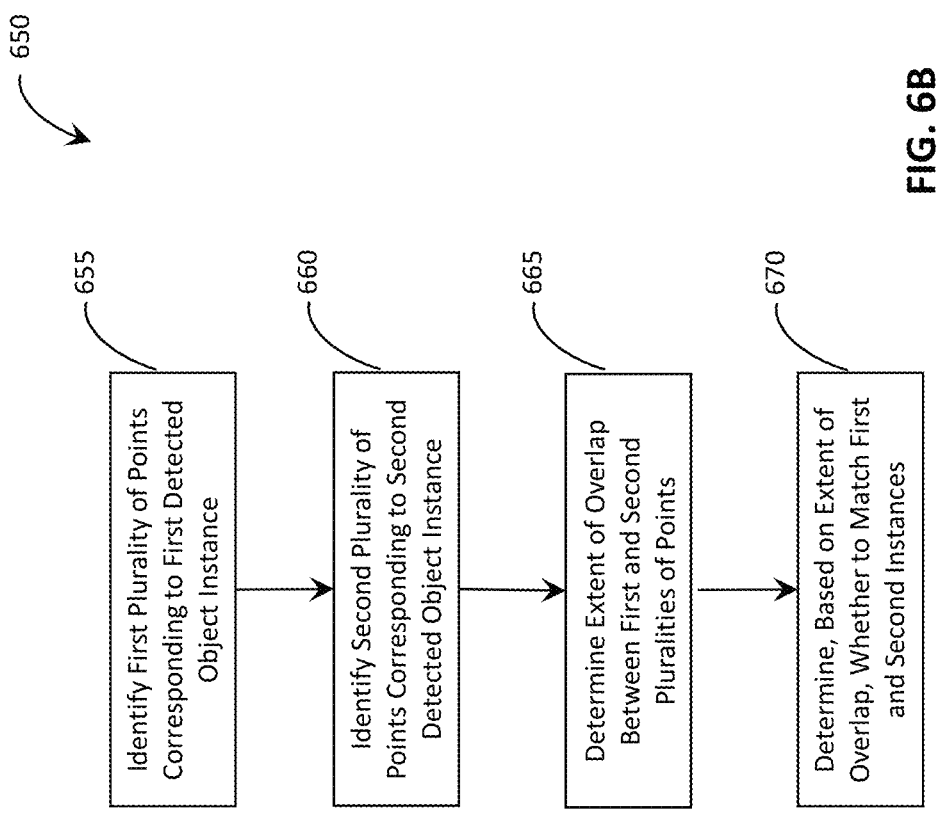

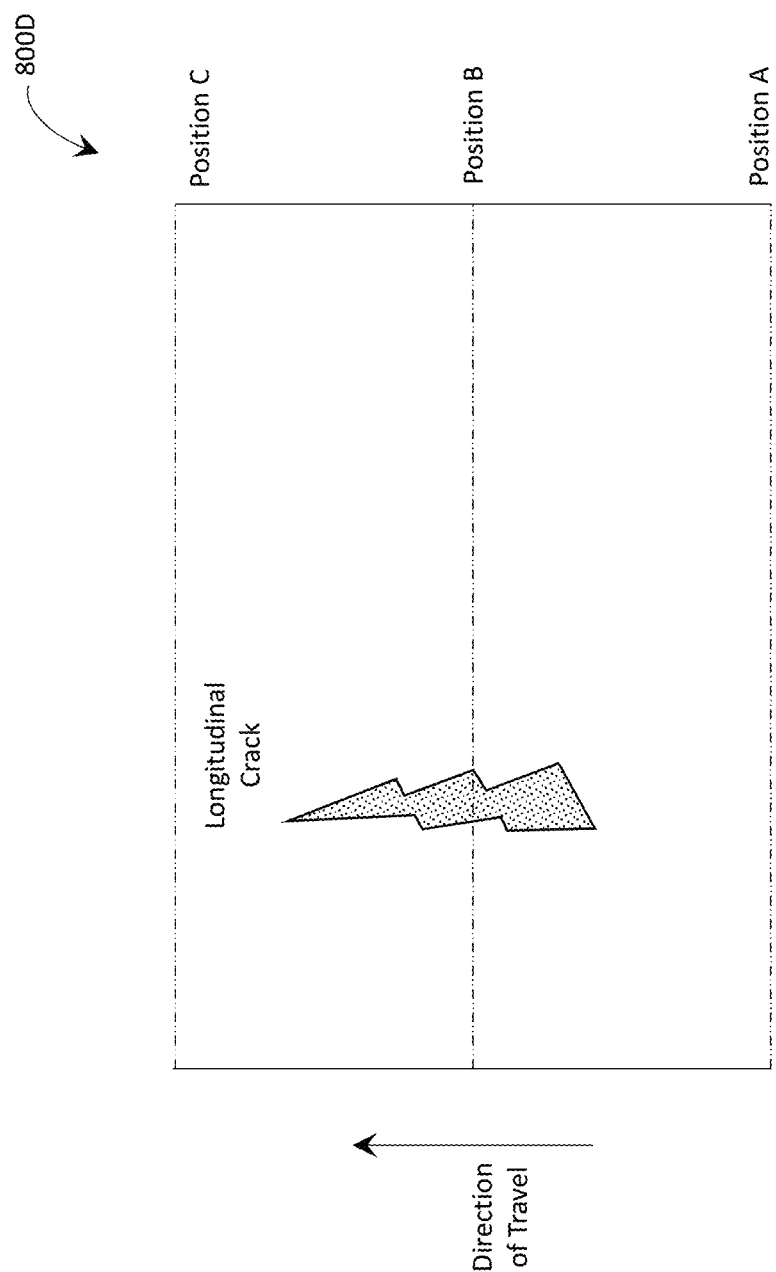

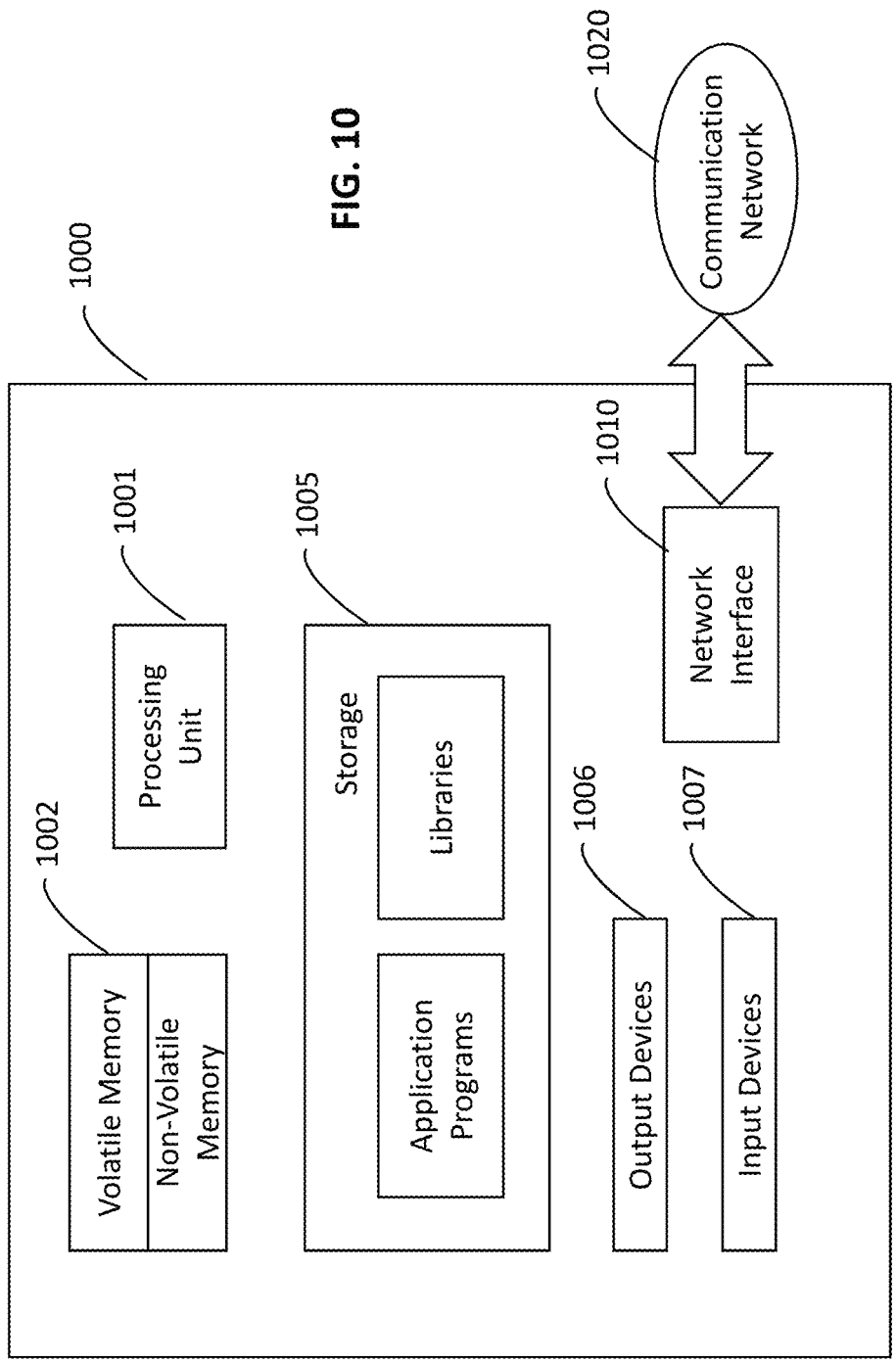

SYSTEMS AND METHODS FOR CREATING AND/OR ANALYZING THREE-DIMENSIONAL MODELS OF INFRASTRUCTURE ASSETS

RELATED APPLICATION

This application is a Continuation of U.S. application Ser. No. 17/925,958, filed Nov. 17, 2022, which is a national stage filing under 35 U.S.C. § 371 of International Patent Application Serial No. PCT/US2021/032820, filed May 17, 2021, which claims priority benefit under 35 U.S.C. § 119 (e) to U.S. Provisional Application No. 63/026,602, filed on May 18, 2020, entitled "SYSTEMS AND METHODS FOR ASSESSING INFRASTRUCTURE,". The contents of these applications are incorporated herein by reference in their entirety.

BACKGROUND

Reliable infrastructure (e.g., transportation, telecommunication, energy, water, etc.) is vital to every country's economy. Both public entities (e.g., federal, state, county, and municipal governments) and private entities (e.g., utility companies) invest enormous amounts of resources to build and maintain infrastructure assets such as roads, railways, bridges, canals, airports, pipelines, cables, etc.

SUMMARY

In accordance with some embodiments, a method is provided, comprising acts of: using a plurality of images captured by a moving camera to generate a point cloud; identifying, from the point cloud, a plurality of points corresponding to a pavement surface; using the plurality of points to generate at least one synthetic image of the pavement surface, the at least one synthetic image having at least one selected camera pose; and using the at least one synthetic image to assess at least one condition of the pavement surface.

In accordance with some embodiments, a method is provided, comprising acts of: analyzing sensor data to detect at least one infrastructure asset, wherein: the sensor data comprises a plurality of images captured by a moving camera; and the at least one infrastructure asset comprises at least one sign; using the plurality of images to generate a point cloud, wherein the point cloud is georeferenced based on geospatial metadata associated with the plurality of images; identifying, from the point cloud, one or more points corresponding to the at least one sign; and using coordinates of the one or more points in the point cloud to associate geospatial information with the at least one sign.

In accordance with some embodiments, a system is provided, comprising at least one processor and at least one computer-readable storage medium having stored thereon instructions which, when executed, program the at least one processor to perform any of the methods described herein.

In accordance with some embodiments, at least one computer-readable storage medium is provided, having stored thereon instructions which, when executed, program at least one processor to perform any of the methods described herein.

BRIEF DESCRIPTION OF DRAWINGS

FIG. 1A shows an illustrative infrastructure assessment system 100, in accordance with some embodiments.

FIG. 2 shows an illustrative process 200 for signage inspection, in accordance with some embodiments.

FIG. 5A shows illustrative positions of a camera relative to an object, in accordance with some embodiments.

FIG. 6B shows an illustrative process 650 for matching detected object instances, in accordance with some embodiments.

FIGS. 8C-D represent, respectively, illustrative synthetic images 800C-D, in accordance with some embodiments.

FIG. 10 shows, schematically, an illustrative computer 1000 on which any aspect of the present disclosure may be implemented.

DETAILED DESCRIPTION

Figure 1B:
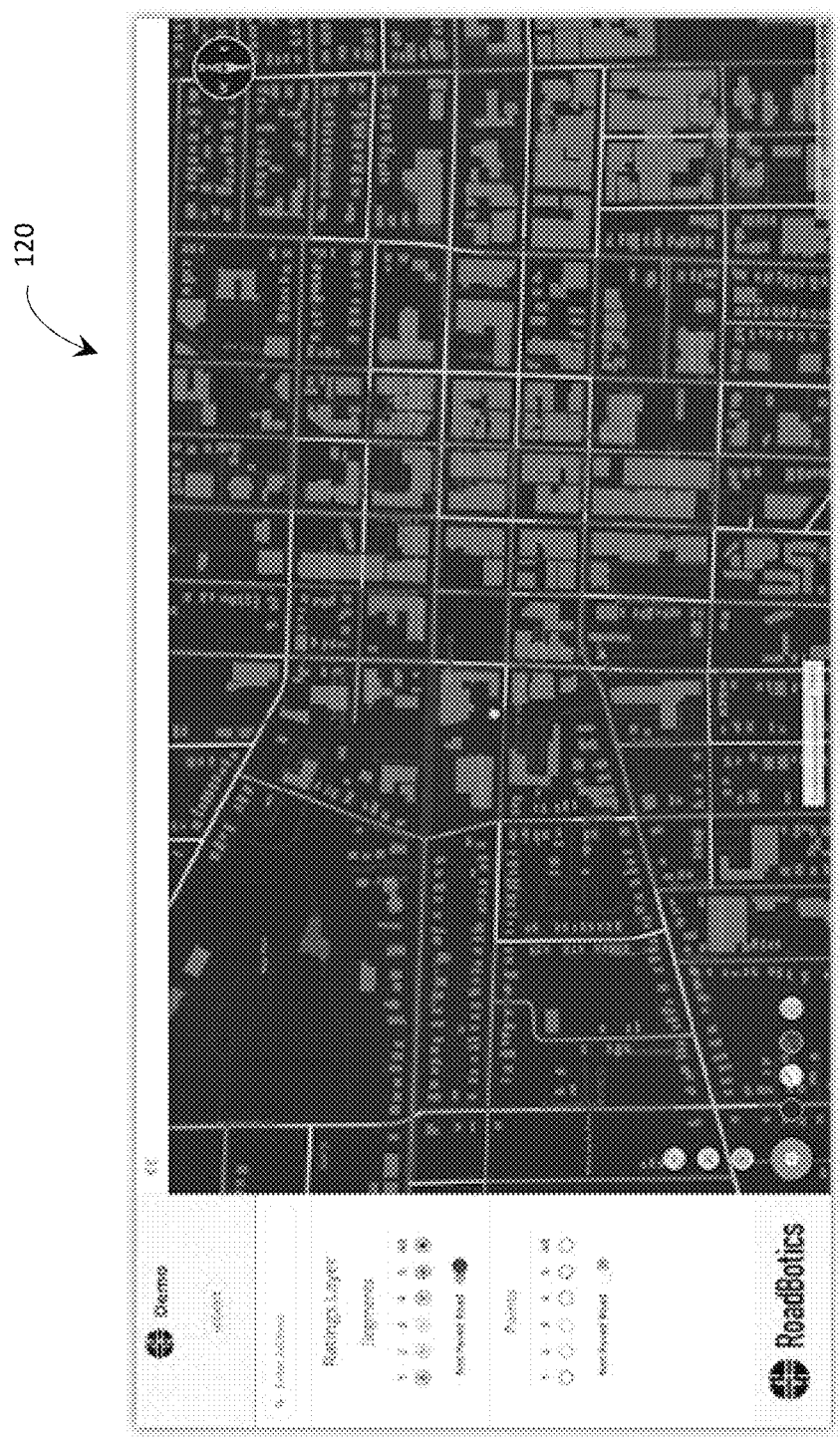
FIG. 1B shows an illustrative user interface 120, in accordance with some embodiments.

The sheer scale and geographic extent of infrastructure assets lead to challenges in monitoring and maintenance. For instance, there are currently about 25 million miles of paved roads worldwide, with about 4 million miles in the US alone. Enormous amounts of resources (e.g., labor, materials, equipment, etc.) are needed to ensure safe operations of these roads.

The inventors have recognized and appreciated that signage is an important, but sometimes neglected category of infrastructure assets. Some types of signage may improve traffic safety. Examples of such signage include, but are not limited to, speed limit signs, warning signs, yield signs, stop signs, traffic lights, etc. Other types of signage may provide information to infrastructure users. Examples of such signage include, but are not limited to, street name signs, rest area signs, distance signs, message boards, etc. Various government agencies (e.g., departments of transportation at municipal, county, state, and/or federal levels) may be responsible for installing and/or maintaining appropriate signage along roads and/or other infrastructure, but this may often be done in an ad hoc manner.

For instance, an entity may install many different types of signage over time throughout a geographic area, and may not have kept records of what signs are installed where. Moreover, even if there is an inventory of signs for which an entity is responsible, inspection of such signs may be conducted manually, which may be a costly and/or time consuming process. Among competing demands, signage inspection may be postponed or forgone. For these reasons, signs that become damaged or go missing (e.g., due to accidents, storms, vandalism, etc.) may not be repaired or replaced in a timely manner, or ever.

The inventors have recognized and appreciated that missing or damaged signs may cause inconvenience to infrastructure users, and sometimes may become safety hazards. As an example, a missing stop sign may cause confusion between drivers as to who has right of way, which may increase a likelihood of a collision.

Accordingly, in some embodiments, one or more machine learning techniques may be provided for detecting, geolocating, assessing, and/or inventorying signage. For instance, a machine learning model may be provided that analyzes sensor data (e.g., one or more images) to detect one or more types of signage. The sensor data may be associated with geospatial metadata, which may be used to geolocate a detected sign. In this manner, an inventory of geolocated signs may be created by canvassing a geographic area to collect sensor data from multiple signs. Such canvassing may be done via one or more contemporaneous data collection trips. Additionally, or alternatively, data collection trips may be conducted over time.

In some embodiments, a machine learning model may be provided that assesses a condition of a sign at least in part by analyzing sensor data (e.g., one or more images) collected from the sign. For example, the machine learning model may output an assessment indicating a physical condition of the sign, such as whether a support structure on which a sign face is mounted is damaged (e.g., leaning, bent, etc.), and/or whether the sign face itself is damaged (e.g., faded, broken, painted over by graffiti, etc.).

In some embodiments, a machine learning model may be trained using sensor data that has been labeled by human inspectors. In this manner, the machine learning model may learn the human inspectors' judgments, and may output assessments similar to those made by the human inspectors.

In some embodiments, a deep learning architecture may be used to extract features from input data, and to make assessments based on the extracted features. For instance, the deep learning architecture may include a plurality of layers arranged in a sequence. Each layer may be configured to produce a composite representation of its input, and may output the composite representation to a next layer. High level features extracted by such a sequence of layers may be provided as input to a classification layer, which may in turn output an assessment. Through training, the feature extraction layers may learn to extract progressively higher level features that are relevant for assessment, while the classification layer may learn to output assessments similar to those made by human inspectors who labeled training data.

It should be appreciated that aspects of the present disclosure are not limited to using a supervised learning technique, or any machine learning technique at all. In some embodiments, one or more unsupervised learning techniques may be used in addition to, or instead of, one or more supervised learning techniques. Moreover, any suitable architecture may be used in addition to, or instead of, a deep learning architecture.

In some embodiments, one or more three-dimensional (3D) point cloud techniques may be used to assess a condition of a sign. For instance, a 3D point cloud may be generated based on sensor data (e.g., one or more images). A sign and/or one or more objects in a surrounding environment (e.g., pavement, traffic light, utility pole, tree, etc.) may be identified in the point cloud.

In some embodiments, one or more points in a point cloud may be associated with geospatial information (e.g., latitude, longitude, and/or altitude). Such geospatial information may be used to output an assessment indicating whether a sign identified in the point cloud is in compliance with one or more regulations (e.g., appropriate size, orientation, height, horizontal placement, etc.). Additionally, or alternatively, the geospatial information from the point cloud may be used to output an assessment indicating visibility of the sign (e.g., whether the sign is blocked from view at a certain distance and/or a certain angle by another object).

It should be appreciated that the techniques introduced above and/or discussed in detail below may be implemented in any of numerous ways, as these techniques are not limited to any particular manner of implementation. Examples of implementation details are provided herein solely for purposes of illustration. Furthermore, the techniques disclosed herein may be used individually or in any suitable combination, as aspects of the present disclosure are not limited to any particular technique or combination of techniques.

FIG. 1A shows an illustrative infrastructure assessment system 100, in accordance with some embodiments. In this example, the infrastructure assessment system 100 is configured to receive sensor data from a data collection system 105, and to provide assessment outputs to an infrastructure management system 110.

The data collection system 105 may collect sensor data from infrastructure assets of any suitable type, such as paved roads, traffic signs, fire hydrants, manholes, utility poles, fences, cables, pipelines, etc. Such a data collection system may be deployed in a number of different ways. For instance, the data collection system 105 may include one or more sensors (e.g., a camera) carried by a vehicle, such as a land vehicle (e.g., a car), an aerial vehicle (e.g., a drone), a water vehicle (e.g., a boat), etc. Additionally, or alternatively, the data collection system 105 may include one or more sensors attached to a structure suitably located to allow monitoring of one or more infrastructure assets. Additionally, or alternatively, the data collection system 105 may include one or more sensors attached to an infrastructure asset itself.

A sensor may be attached to a vehicle or a structure in any suitable manner. For example, the inventors have recognized and appreciated that integrated cameras on mobile devices such as smartphones may be used to capture images of infrastructure assets. Accordingly, in some embodiments, the data collection system 105 may include a mobile device mounted on a dashboard or a windshield of a car. As the car drives on selected roads, an integrated camera of the mobile device may capture images of pavement surfaces, traffic signs, fire hydrants, manholes, utility poles, fences, cables, pipelines, etc.

In some embodiments, one or more network interfaces of the mobile device may be used to transmit collected data to the infrastructure assessment system 100. The one or more network interfaces may implement one or more networking technologies, such as 5G, LTE, WiMAX, WiFi, Ethernet, Bluetooth, etc. The one or more networking technologies may allow the collected data to be transmitted in real time (e.g., while a data collection trip is still in progress). This may in turn allow the infrastructure assessment system 100 to process the collected data and provide feedback to the data collection system 105 in real time.

For instance, the infrastructure assessment system 100 may check quality of the collected data (e.g., sharpness, brightness, and/or other quality measures of images). If the collected data is deemed undesirable in one or more aspects, the infrastructure assessment system 100 may send a request to the data collection system 105 to adjust one or more data collection parameters (e.g., focus, image resolution, color depth, etc.). Additionally, or alternatively, the infrastructure assessment system 100 may request that the data collection system 105 repeat one or more data collection tasks (e.g., driving over one or more road segments already traversed to acquire higher quality images).

In some embodiments, the data collection system 105 may include an app running on the mobile device. This app may be programmed to adjust one or more data collection parameters in response to a request from the infrastructure assessment system 100. Additionally, or alternatively, the app may be programmed to perform one or more quality checks locally, and may adjust one or more data collection parameters, and/or cause the data collection system 105 to repeat one or more data collection tasks, according to one or more quality measurements.

In some embodiments, the app running on the mobile device may be programmed to provide a user interface. For instance, the app may be programmed to display, to a human operator, one or more instructions regarding a data collection task. The one or more instructions may be received from the infrastructure assessment system 100, and/or generated locally by the data collection system 105.

As an example, the data collection system 105 may include a camera attached to a vehicle, and the data collection task may include driving over a selected plurality of road segments to collect images of pavement surfaces. The infrastructure assessment system 100 and/or the data collection system 105 may be programmed to determine a suitable route for the vehicle to cover the selected plurality of road segments. The app may be programmed to display, based on the determined route, turn-by-turn instructions to a human operator of the vehicle.

It should be appreciated that aspects of the present disclosure are not limited to using a human-operated vehicle, or any vehicle at all, to collect data from infrastructure assets. In some embodiments, an autonomous vehicle may be used instead of, or in addition to, a human-operated vehicle. The data collection system 105 may be programmed to provide, to the autonomous vehicle, the determined route and/or one or more real time updates (e.g., returning to one or more road segments already traversed to acquire higher quality images).

In some embodiments, the app running on the mobile device may be programmed to process raw sensor data, and the processed data may be transmitted to the infrastructure assessment system 100 instead of, or in addition to, the raw sensor data.

As one example, the raw sensor data may include a video stream. The app may be programmed to downsample the video stream, so that less bandwidth may be used for transmitting data to the infrastructure assessment system 100. In some embodiments, the video stream may have associated geospatial metadata. Additionally, or alternatively, the app may be programmed to use timestamps associated the video stream, in combination with Global Positioning System (GPS), compass, accelerometer, gyroscope, and/or other data, to tag one or more image frames in the video stream with geospatial metadata. This may in turn allow the app to downsample the video stream based on location, for example, into a sequence of image frames at regular distance intervals (e.g., one frame per meter, 2 meters, 3 meters, 4 meters, 5 meters, etc.).

As another example, the app running on the mobile device may be programmed to perform one or more types of feature extraction. For instance, the app may perform edge detection on one or more image frames, and may transmit a representation of one or more detected edges to the infrastructure assessment system 100, instead of, or in addition to, the one or more image frames. Additionally, or alternatively, the app may detect one or more objects (e.g., a pavement surface, a traffic sign, a fire hydrant, a manhole, a utility pole, a fence, a cable, a pipeline, etc.) from one or more image frames, and may transmit one or more corresponding image portions to the infrastructure assessment system 100, instead of, or in addition to, the one or more image frames in their entireties.

The inventors have recognized and appreciated that performing feature extraction prior to downsampling may improve accuracy. However, it should be appreciated that aspects of the present disclosure are not limited to using any particular technique or combination of techniques, or any technique at all, to reduce bandwidth for transmitting data to the infrastructure assessment system 100.

Although the inventors have recognized and appreciated various benefits of using a mobile device such as a smartphone to collect, process, and/or transmit data, it should be appreciated that aspects of the present disclosure are not so limited. In some embodiments, one or more sensors may be integrated into a vehicle (e.g., a drone). Additionally, or alternatively, data collected by the one or more sensors may be stored in a memory integrated into the vehicle, and/or transmitted to the infrastructure assessment system 100 via a network interface integrated into the vehicle. Additionally, or alternatively, any one or more of the illustrative data processing functionalities described herein may be performed by one or more processors integrated into the vehicle.

It should also be appreciated that aspects of the present disclosure are not limited to acquiring visible light images from infrastructure assets. In some embodiments, one or more other sensing techniques (e.g., based on infrared radiation, X ray, lidar, radar, ultrasound, electric current, magnetic field, etc.) may be used in addition to, or instead of, visible light imaging.

Returning to the example of FIG. 1A, the infrastructure assessment system 100 may provide assessment outputs to the infrastructure management system 110 in any suitable manner. For instance, the infrastructure management system 110 may, in some embodiments, include a web browser configured to render a user interface based on data and/or one or more scripts received from the infrastructure management system 110. Additionally, or alternatively, the infrastructure management system 110 may include user interface software programmed to display data received from the infrastructure management system 110. The received data may be in any suitable form, such as a geographic information system (GIS) file, a comma separated values (CSV) file, etc. A GIS file may be in any suitable format, such as shapefile, GeoJSON, Keyhole Markup Language (KML), etc.

FIG. 1B shows an illustrative user interface 120, in accordance with some embodiments. The user interface 120 may be a user interface of the illustrative infrastructure management system 110 in the example of FIG. 1A, and may display a map of one or more infrastructure assets, along with one or more visual indications adapted to convey information about the one or more infrastructure assets, respectively.

In the example of FIG. 1B, the user interface 120 displays infrastructure assets (e.g., road segments) in selected colors based on respective assessment scores assigned to the infrastructure assets, such as dark green for 1 (e.g., good condition), light green for 2 (e.g., minor damage), yellow for 3 (e.g., moderate damage), orange for 4 (e.g., significant damage), red for 5 (e.g., severe damage), etc. However, it should be appreciated that aspects of the present disclosure are not limited to using any particular scoring or color coding scheme, or any scoring or color coding scheme at all.

The infrastructure assessment system 100 may assign an assessment score to an infrastructure asset in any suitable manner. For example, one or more images may be collected along a road segment, and an assessment score may be assigned to each such image. An aggregate score may be generated based on the one or more assessment scores, and may be assigned to the road segment as a whole. The aggregate score may be generated in any suitable manner, for instance, by calculating an average (e.g., mean, median, mode, etc.), with or without removal of one or more outliers.

In some embodiments, a user interface of the infrastructure management system 110 may allow a user to filter infrastructure assets to be displayed on a map. For instance, in the example of FIG. 1B, the user interface 120 allows the user to filter based on assessment score (e.g., all road segments assigned a score of 5, all road segments assigned a score of 4 or higher, etc.). As another example, the user may be allowed to filter based on recommended maintenance type (e.g., all road segments with lane markers that should be reapplied, all fire hydrants that should be repainted, all stop signs obscured by vegetation that should be removed, etc.).

In some embodiments, a user interface of the infrastructure management system 110 may allow a user to call up information associated with an infrastructure asset. For instance, the infrastructure asset may be represented by one or more clickable icons. In response to the user clicking on an icon, the user interface may display an image of the infrastructure asset, an assessment score, a recommended type of maintenance, and/or any other suitable information.

Figure 1C:
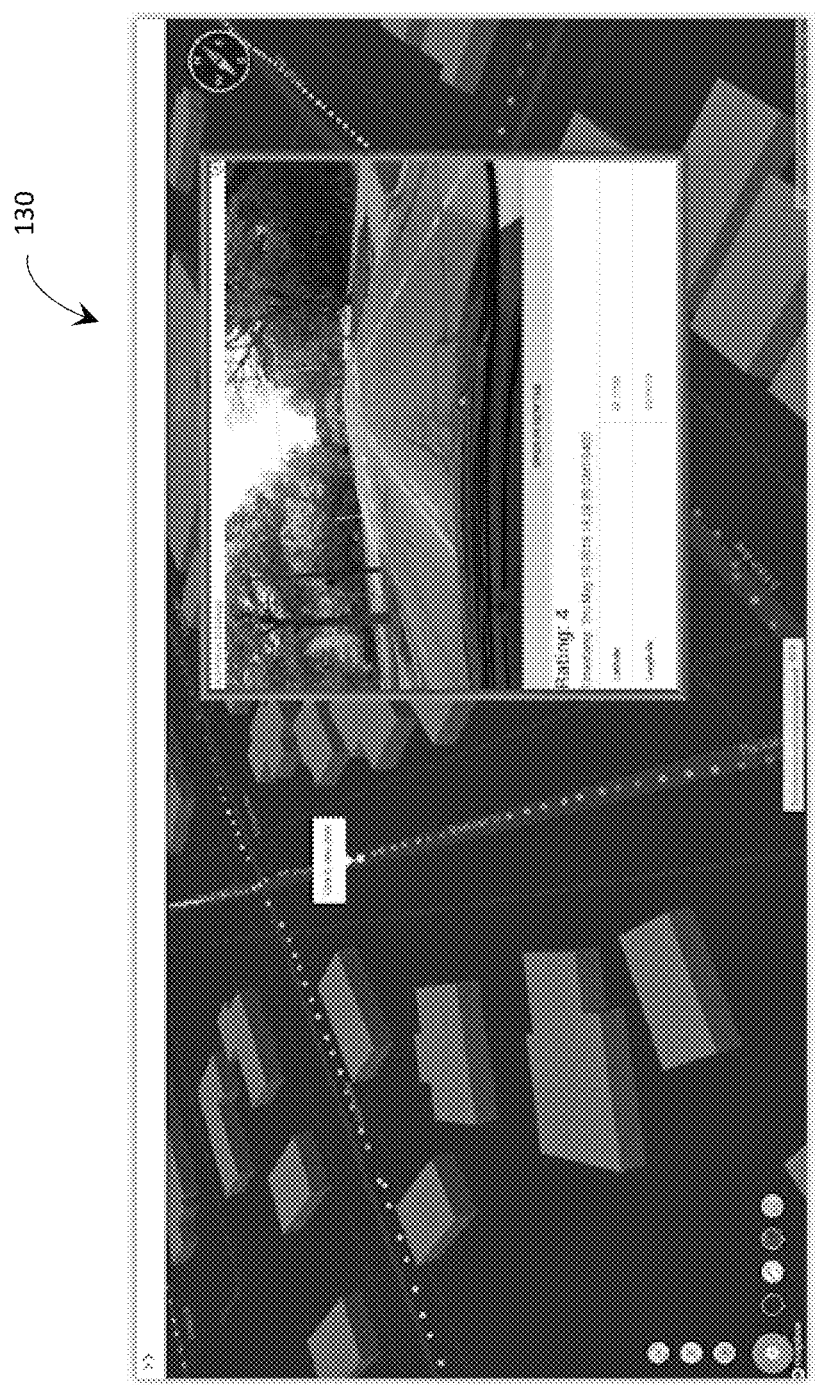
FIG. 1C shows an illustrative user interface 130, in accordance with some embodiments.

FIG. 1C shows an illustrative user interface 130, in accordance with some embodiments. In this example, a road segment is shown with a plurality of clickable dots corresponding, respectively, to a plurality of regularly spaced locations along the road segment (e.g., one dot per meter, 2 meters, 3 meters, 4 meters, 5 meters, etc.). In response to a user clicking on a dot, the user interface 130 may display an image collected at the corresponding location, along with an assessment score, a timestamp, and/or GPS coordinates associated with the image. The dots may be color coded based on respective assessment scores, for example, as described above in connection with the example of FIG. 1B.

The inventors have recognized and appreciated that many entities are using data collection systems such as the illustrative data collection system 105 in the example of FIG. 1A to canvass roads for which the entities are responsible. Because of a high degree of automation provided by the data collection system 105, such canvassing may be performed relatively frequently, for example, every year, every two years, etc.

The inventors have further recognized and appreciated that, although most data collection trips are conducted to collect data for use in assessing conditions of road surfaces, the collected data may include information about other infrastructure assets. For instance, a video taken while a data collection vehicle travels on a road may show not only pavement surfaces, but also traffic signs, utility poles, fire hydrants, etc. located along the road. Accordingly, in some embodiments, such infrastructure assets may be assessed using data collected for road surface assessment, without conducting separate data collection trips. This may provide significant savings in time and/or other resources. However, it should be appreciated that aspects of the present disclosure are not limited to using a common data set to assess different types of infrastructure assets.

While various implementation details are shown in FIGS. 1A-C and described above, it should be appreciated that such details are provided herein solely for purposes of illustration. For instance, aspects of the present disclosure are not limited to having three systems for data collection, assessment, and management, respectively. Any functionality or combination of functionalities described herein may be performed by a single system, or distributed in any suitable manner across two or more systems.

FIG. 2 shows an illustrative process 200 for signage inspection, in accordance with some embodiments. For instance, the process 200 may be used by the illustrative infrastructure assessment system 100 in the example of FIG. 1A to detect, geolocate, assess, and/or inventory signage.

At act 205, the infrastructure assessment system 100 may process sensor data to detect one or more signs. In some embodiments, the sensor data may include one or more images received from the illustrative data collection system 105 in the example of FIG. 1A. Such an image may be captured by a camera mounted on a vehicle traveling on one or more selected roads.

In some embodiments, one or more machine learning techniques may be used to detect, from an image, one or more regions of interest. For instance, a machine learning model may be provided that analyzes an input image, and outputs one or more detected regions. Such a machine learning model may be referred to herein as a detection model.

In some embodiments, a detected region may be provided as input to another machine learning model, which may analyze the detected region, and output a classification label. Such a machine learning model may be referred to herein as a classification model.

In some embodiments, a classification model may output a label indicative of an infrastructure asset type. Examples of such classification labels include, but are not limited to, pavement, signage, hydrant, utility pole, fence, cable, pipeline, etc.

Additionally, or alternatively, a classification model may output a label indicative of a subtype within an infrastructure asset type. For instance, the infrastructure asset type may be signage, and the label may indicate a signage type. Examples of signage types include, but are not limited to, speed limit sign (e.g., 25 mph, 30 mph, 35 mph, 40 mph, etc.), stop sign, yield sign, do not enter sign, one way sign, no left turn sign, no right turn sign, no U turn sign, street name sign, etc.

It should be appreciated that aspects of the present disclosure are not limited to using separate models for detection and classification. In some embodiments, a single model may be used that outputs a detected region along with a classification label. For instance, a model may be used that analyzes an input image, and outputs one or more detected regions along with one or more respective classification labels.

In some embodiments, detection and classification may be performed using a combination of different machine learning techniques. For instance, a model may be used that analyzes an input image, and outputs one or more detected regions along with one or more respective classification labels indicative of infrastructure asset type (e.g., pavement, signage, hydrant, utility pole, fence, cable, pipeline, etc.). A detected region of a selected type may be further analyzed to output a subtype classification. For instance, one or more optical character recognition techniques may be used to determine a signage type for a detected sign.

In some embodiments, a machine learning model may be provided to detect, from an image, a plurality of pixels that are likely to represent an infrastructure asset of a certain type and/or a certain subtype. Such a machine learning model may be referred to herein as a segmentation model. For instance, a segmentation model may analyze an input image, and output one or more detected stop signs by labeling one or more sets of pixels in the input image as corresponding, respectively, to the one or more detected stop signs (e.g., "stop_sign_0," "stop_sign_1," etc.).

Figure 3:
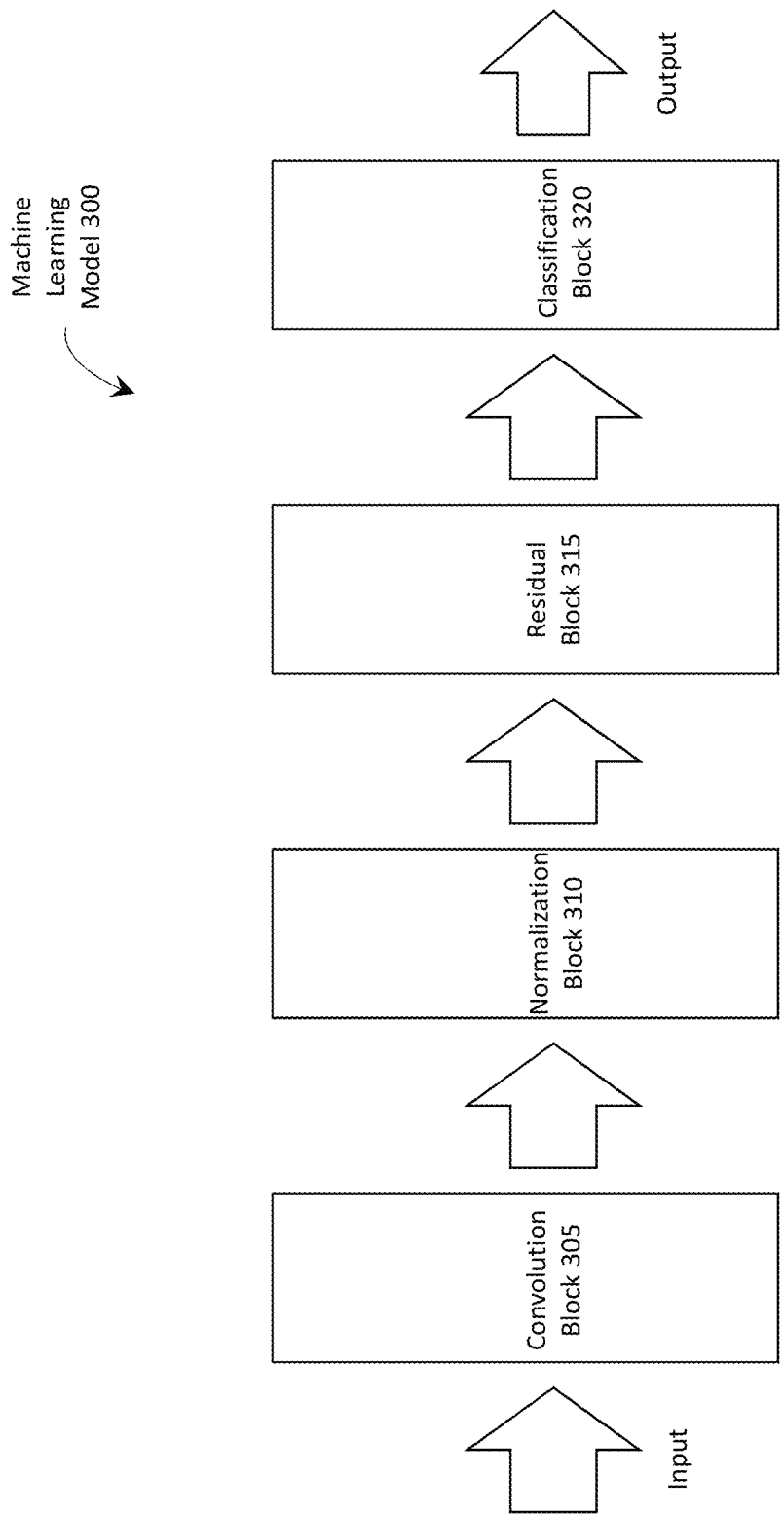
FIG. 3 shows an illustrative machine learning model 300, in accordance with some embodiments.

A detection, classification, and/or segmentation model may be implemented in any suitable manner. For example, a detection, classification, and/or segmentation model may include a convolutional neural network (CNN), which may be trained using images that have been labeled by humans. An illustrative CNN architecture is shown in FIG. 3 and described below. However, it should be appreciated that aspects of the present disclosure are not limited to using any particular type of machine learning model, or any machine learning model at all, to detect regions of interest, to classify detected regions, or to detect a plurality of pixels of interest.

Referring again to the example of FIG. 2, the infrastructure assessment system 100 may, at act 210, geolocate one or more signs detected at act 205. In some embodiments, this may be done based on geospatial metadata associated with the sensor data received from the data collection system 105. For instance, as described above in connection with the example of FIG. 1A, the data collection system 105 may capture a video stream while traveling along one or more selected roads, and may use GPS, compass, motion sensor, rotation sensor, and/or other data to tag one or more image frames in the video stream with geospatial metadata (e.g., GPS coordinates, compass heading, etc.). Thus, if a sign is detected from an image frame, the infrastructure assessment system 100 may geolocate the detected sign based on geospatial metadata associated with the image frame.

In some embodiments, one or more measurements (e.g., a distance between two detected corners, an angle between two detected edges, etc.) may be taken from a sign in an image frame. If the sign has a known shape and a known size (e.g., due to standardization of signs), the one or more measurements taken from the image frame may be used to estimate a camera pose (e.g., a camera position and/or a camera orientation) relative to the sign. The camera pose may in turn be used, along with geospatial metadata (e.g., GPS coordinates) associated with the image frame, to geolocate the sign.

In some embodiments, if a sign has an unknown shape and/or an unknown size, measurements from the sign in multiple image frames may be used to geolocate the sign. For instance, one or more Structure-from-Motion (SfM) techniques[1] may be used to generate a point cloud from multiple image frames in which a sign is detected. Such a point cloud may be aligned to a real-world coordinate system, for example, using geospatial metadata (e.g., GPS coordinates) associated with one or more of the image frames. Accordingly, the sign may be geolocated based on coordinates of one or more points in the point cloud that correspond to the sign.≠[1]See, e.g., Pierre Moulton, et al., Global Fusion of Relative Motions for Robust, Accurate and Scalable Structure from Motion.

In some embodiments, an SfM technique may involve tracking features across two or more image frames, and using trajectories of the tracked features to determine relative camera motion (e.g., pairwise relative rotation and/or pairwise relative translation). Examples of features that may be tracked include, but are not limited to, corners, edges, curves, etc.

Any suitable technique or combination of techniques may be used to track features across multiple image frames. For instance, a scale-invariant feature transform (SIFT) technique may be applied to one or more reference images to provide a description for an infrastructure asset type (e.g., signage) and/or a subtype (e.g., stop sign). This description may be based on relative positions of points of interest (e.g., corners of a sign), and may be used to identify matching points across multiple image frames.

The inventors have recognized and appreciated that some feature tracking techniques (e.g., SIFT) are primarily based on geometric information. As such, these techniques may be computationally intensive, and/or may have relatively high error rates. Accordingly, in some embodiments, semantic information may be used to improve efficiency and/or accuracy of feature tracking. For instance, as described above, a segmentation model may be used at act 205 to label one or more pixels of an image frame with an infrastructure asset type (e.g., signage) and/or a subtype (e.g., stop sign). Such labels may be used to match features detected in different image frames. For example, a stop signed detected in a first image frame may be matched to a stop sign detected in a second image frame. Additionally, or alternatively, if one or more first pixels in a first image frame are tentatively matched (e.g., by SIFT) to one or more second pixels in a second image frame, but have different segmentation labels, the tentative match may be overruled and/or flagged for further analysis.

It should be appreciated that aspects of the present disclosure are not limited to using feature tracking to determine relative camera motion. In some embodiments, geospatial metadata associated with two or more image frames may be used to determine relative camera motion. As one example, GPS coordinates associated with two image frames may be used to determine a relative camera translation between those image frames. As another example, GPS coordinates associated with a sequence of image frames captured in a small time window (e.g., within one second, two seconds, three seconds, . . . ) may be used to determine a direction of movement, which may in turn be used to determine a camera orientation.

In some embodiments, measurements from a sign in multiple image frames, along with relative camera motion among the image frames, may be used determine camera poses for the image frames and/or coordinates of tracked features of the sign. Any suitable SfM technique or combination of SfM techniques may be used, such as incremental SfM (where camera poses are solved for one by one) and/or global SfM (where camera poses are solved for simultaneously). For instance, in a global SfM approach, pairwise relative rotations may be determined first, and may be used to determine global rotations, relative translations, and/or coordinates of tracked features. The relative translations may in turn be used to determine global translations.

It should be appreciated that an SfM technique may be applied to any suitable plurality of image frames, including image frames that are not consecutive. For instance, as a vehicle with a camera mounted thereon travels along a road, a sign may come into the camera's field of view, become blocked by another object (e.g., a tree or a utility pole), and then come back into the field of view. Additionally, or alternatively, an SfM technique may be applied to image frames that are out of order.

It should also be appreciated that aspects of the present disclosure are not limited to using a point cloud to geolocate a sign. In some embodiments, given a sequence of image frames, geospatial information of the last image frame in which the sign is detected may be used as geospatial information of the sign, because such an image frame is likely captured when the camera is closest to the sign.

Referring again to the example of FIG. 2, the infrastructure assessment system 100 may, at act 215, assess one or more signs detected at act 205. For instance, in some embodiments, one or more points in a point cloud generated at act 210 may be associated with geospatial information (e.g., latitude, longitude, and/or altitude). Such geospatial information may be used to output an assessment indicating whether a sign, which may be associated with one or more points in the point cloud, is in compliance with one or more regulations (e.g., appropriate size, orientation, height, horizontal placement, etc.). Additionally, or alternatively, the geospatial information from the point cloud may be used to output an assessment indicating visibility of the sign (e.g., whether the sign is blocked from view at a certain distance and/or a certain angle by another object in the point cloud).

It should be appreciated that aspects of the present disclosure are not limited to assessing visibility of a sign in any particular manner, or at all. In addition to, or instead of, using a point cloud, geospatial metadata associated with the earliest image frame in a sequence of image frames in which a sign is detected (e.g., using a segmentation model) may be used to assess a distance at which a sign is visible.

In some embodiments, if a sign appears in multiple images, a representative image may be selected. For instance, the last image frame in which the sign is detected may be selected, because such an image frame is likely captured when the camera is closest to the sign, and therefore may have the best image of the sign.

In some embodiments, a representative image of a sign may be provided as input to a machine learning model, which may analyze the representative image, and output one or more classification labels indicating a physical condition of the sign. Such a machine learning model may be referred to herein as a signage assessment model.

In some embodiments, classification labels output by a signage assessment model may include numerical scores. For instance, a signage assessment model may output an assessment score of 1 for good condition, 2 for minor damage, 3 for moderate damage, 4 for significant damage, 5 for severe damage. However, it should be appreciated that aspects of the present disclosure are not limited to using any particular scoring scheme, or any scoring scheme at all.

For instance, a signage assessment model may output a classification label indicating that a support structure on which a sign face is mounted is damaged, and/or a type of damage suffered by the support structure (e.g., leaning, bent, etc.).

Additionally, or alternatively, a signage assessment model may output a classification label indicating that the sign face itself is damaged, and/or a type of damage suffered by the sign face (e.g., faded, broken, painted over by graffiti, etc.).

Additionally, or alternatively, a signage assessment model may output a classification label indicating a recommended type of maintenance (e.g., replacing the sign face and/or the support structure, repositioning the sign face and/or the support structure, etc.).

A signage assessment model may be implemented in any suitable manner. For example, a signage assessment model may include a convolutional neural network (CNN), which may be trained using signage images that have been labeled by humans. An illustrative CNN architecture is shown in FIG. 3 and described below. However, it should be appreciated that aspects of the present disclosure are not limited to using any particular type of machine learning model, or any machine learning model at all, to assess detected signs.

The inventors have recognized and appreciated that it may be advantageous to use similar machine learning architectures to detect regions of interest, to classify detected regions, to detect a plurality of pixels of interest, and/or to produce an assessment of an infrastructure asset. For instance, weights trained for detection may be used to speed up training and/or improve accuracy for classification, segmentation, and/or assessment. Additionally, or alternatively, weights trained for classification may be used to speed up training and/or improve accuracy for detection, segmentation, and/or assessment. Additionally, or alternatively, weights trained for segmentation may be used to speed up training and/or improve accuracy for detection, classification, and/or assessment. Additionally, or alternatively, weights trained for assessment may be used to speed up training and/or improve accuracy for detection, classification, and/or segmentation. However, it should be appreciated that aspects of the present disclosure are not limited to using transferred weights to train a machine learning model.

In some embodiments, the infrastructure assessment system 100 may aggregate assessment data. For instance, the infrastructure assessment system 100 may provide an overall assessment score for a selected signage type, a selected geographic area, etc. The overall assessment score may be based on a central tendency (e.g., mode, median, mean, etc.) of one or more individual assessment scores associated, respectively, with one or more detected signs of the selected type, in the selected geographic area, etc. However, it should be appreciated that aspects of the present disclosure are not limited to combining numerical scores in any particular way, or at all. In some embodiments, a standard deviation, a variance, or some other measure of how the individual scores are dispersed may be determined. Such a measure may be used to filter the individual scores, for example, by removing one or more outliers.

Referring again to the example of FIG. 2, the infrastructure assessment system 100 may, at act 220, create and/or update an inventory of signs. For instance, given a sign detected at act 205, the infrastructure assessment system 100 may create an inventory entry. The entry may store any suitable information, such as an identifier for the detected sign, signage type (e.g., as determined at act 205), location (e.g., as determined at act 210), and/or condition (e.g., as determined at act 215).

Additionally, or alternatively, the inventory entry may store information based on metadata associated with sensor data from which the sign is detected. For instance, the illustrative data collection system 105 in the example of FIG. 1A may tag image frames in a video stream with relevant metadata such as street name, direction of travel, location identifier (e.g., an OpenStreetMap node identifier), road segment identifier (e.g., an OpenStreetMap way identifier), etc. The infrastructure assessment system 100 may extract such metadata from an image frame from which the sign is detected, and may generate the inventory entry for the detected sign based on the extracted metadata.

In some instances, there may be an existing inventory of signs. Accordingly, the infrastructure assessment system 100 may, in some embodiments, perform a lookup prior to generating a new inventor entry, to determine if a detected sign is already present in the existing inventory. This lookup may be performed in any suitable manner. For example, a query may be constructed based on signage type (e.g., as determined at act 205) and/or location (e.g., as determined at act 210). Additionally, or alternatively, a query may be constructed based on metadata associated with sensor data from which the sign is detected (e.g., a street name, a direction of travel, a location identifier such as an OpenStreetMap node identifier, a road segment identifier such as an OpenStreetMap way identifier, etc.).

In some embodiments, if a detected sign does not match an entry in an existing inventory, a new entry may be generated and inserted into the inventory. If the detected sign matches an entry in the existing inventory, the infrastructure assessment system 100 may determine whether the matching entry should be updated. For example, the infrastructure assessment system 100 may determine whether an assessment score determined for the detected sign at act 215 differs from an assessment score stored in the matching entry. If so, the matching entry may be updated with the assessment score determined at act 215. Additionally, or alternatively, the infrastructure assessment system 100 may add newly collected metadata, and/or remove out-of-date metadata.

The inventors have recognized and appreciated that, in some instances, signs may go missing due to accidents, storms, vandalism, etc. Missing signs may cause inconvenience to infrastructure users, and sometimes may become safety hazards. As an example, a missing stop sign may cause confusion between drivers as to who has right of way, which may increase a likelihood of a collision. Indeed, a missing stop sign may go unnoticed until an accident occurs and is investigated.

Accordingly, in some embodiments, the infrastructure assessment system 100 may identify one or more road segments traversed during a data collection trip, and may use the one or more road segments to look up an existing inventory of signs. For each entry in the inventory matching the one or more road segments, the infrastructure assessment system 100 may check whether the entry matches any sign detected at act 205. If the entry does not match any sign detected at act 205, the infrastructure assessment system 100 may infer that a sign may have gone missing, and may report the potentially missing sign to a user (e.g., via the illustrative infrastructure management system 110 in the example of FIG. 1A).

While various implementation details are shown in FIG. 2 and described above, it should be appreciated that such details are provided herein solely for purposes of illustration. For instance, one or more of the techniques described herein for inspecting signage may be used additionally, or alternatively, for inspecting one or more other types of infrastructure assets.

FIG. 3 shows an illustrative machine learning model 300, in accordance with some embodiments. For instance, the machine learning model 300 may be used by the illustrative infrastructure assessment system 100 in the example of FIG. 1A to analyze sensor data, and to output detected infrastructure assets and/or corresponding assessments.

In some embodiments, the machine learning model 300 may receive, as input, an image of an infrastructure asset. The image may be of any suitable size (e.g., 1024×1920 pixels), and may have any suitable number of one or more channels (e.g., greyscale, RGB, HSL, HSV, HSI, CMYK, or another suitable color model). However, it should be appreciated that aspects of the present disclosure are not limited to analyzing images of infrastructure assets. In some embodiments, the machine learning model 300 may be adapted to analyze non-image inputs in addition to, or instead of, images. Example of non-image input include, but are not limited to, prior assessments, electromagnetic testing data (e.g., eddy current testing data), weather data, traffic data, etc.

In some embodiments, the machine learning model 300 may output an assessment corresponding to an input. For instance, the machine learning model 300 may output a numerical score (e.g., an integer from 1 to 5) indicative of a condition of an infrastructure asset to which the input pertains. However, it should be appreciated that aspects of the present disclosure are not limited to assigning numerical scores to infrastructure assets. Additionally, or alternatively, the machine learning model 300 may be adapted to output a confidence interval of a numerical score, a probability of a significant change in condition in a given time period, etc.

In some embodiments, the machine learning model 300 may include one or more blocks, where each block may include one or more processing layers. For instance, the machine learning model 300 may include a convolution block 305, a normalization block 310, a residual block 315, and/or a classification block 320. In the example of FIG. 2, these blocks are arranged in a sequence to perform processing in a certain order. However, it should be appreciated that aspects of the present disclosure are not limited to having any particular block or combination of blocks, or to any particular arrangement of blocks. In some embodiments, there may be one or more convolution blocks, one or more normalization blocks, one or more residual blocks, and/or one or more classification blocks arranged in any suitable manner.

In some embodiments, the convolution block 305 may include one or more convolution layers (not shown in FIG. 3), where each convolution layer may be configured to produce a composite representation of its input. For instance, a convolution layer may have an associated kernel (also referred to as a filter), and may use the kernel perform a convolution operation on the input (e.g., an image) to produce a higher level representation of the input (e.g., one or more edges in the image).

In some embodiments, the convolution block 305 may include a plurality of convolution layers arranged in a sequence, so that an output of a convolution layer may be provided as input to a next convolution layer, with or without intermediate processing. This may allow the convolution block 305 to extract progressively higher level features. The plurality of convolution layers may use a same kernel, or different kernels.

In some embodiments, the normalization block 310 may be configured normalize one or more inputs. For instance, the normalization block 310 may normalize an input based on a mean and/or a variance associated with that input, thereby producing an output with zero mean and/or unit variance. In some embodiments, the input may have multiple dimensions, and the normalization block 310 may perform normalization for the multiple dimensions separately, based on respective means and/or variances. In some embodiments, multiple inputs (e.g., from multiple training samples and/or multiple inference samples) may be batched. A mean and/or a variance may be determined for the batch, and may be used to normalize the inputs in the batch.

The inventors have recognized and appreciated that normalization may reduce vanishing and/or exploding gradients, which may in turn allow a deeper architecture (e.g., more layers) to be implemented more effectively. However, it should be appreciated that aspects of the present disclosure are not limited to using a normalization block.

In some embodiments, the residual block 315 may be configured to allow one or more layers within the residual block 315 to be skipped. For instance, the residual block 315 may include an addition layer configured to add an input to the residual block 315 to an output of one or more other layers within the residual block 315. In this manner, the one or more other layers may be skipped during early training, which may allow more efficient exploration of a feature space. However, it should be appreciated that aspects of the present disclosure are not limited to using a residual block.

In some embodiments, the classification block 320 may include one or more fully connected layers configured to output an assessment corresponding to an input received by the machine learning model 300. For instance, the classification block 320 may include an artificial neural network such as a multilayer perceptron (MLP) with a suitable activation function such as sigmoid, rectified linear unit (ReLU), etc. One or more weights in the MLP may be trained using labeled inputs, so that the MLP may output assessments similar to those made by human inspectors who labeled the inputs. Any suitable training technique may be used, including, but not limited to, stochastic gradient descent (e.g., via backpropagation), Newton, conjugate gradient, quasi-Newton, Levenberg-Marquardt, etc.

Figure 4A:
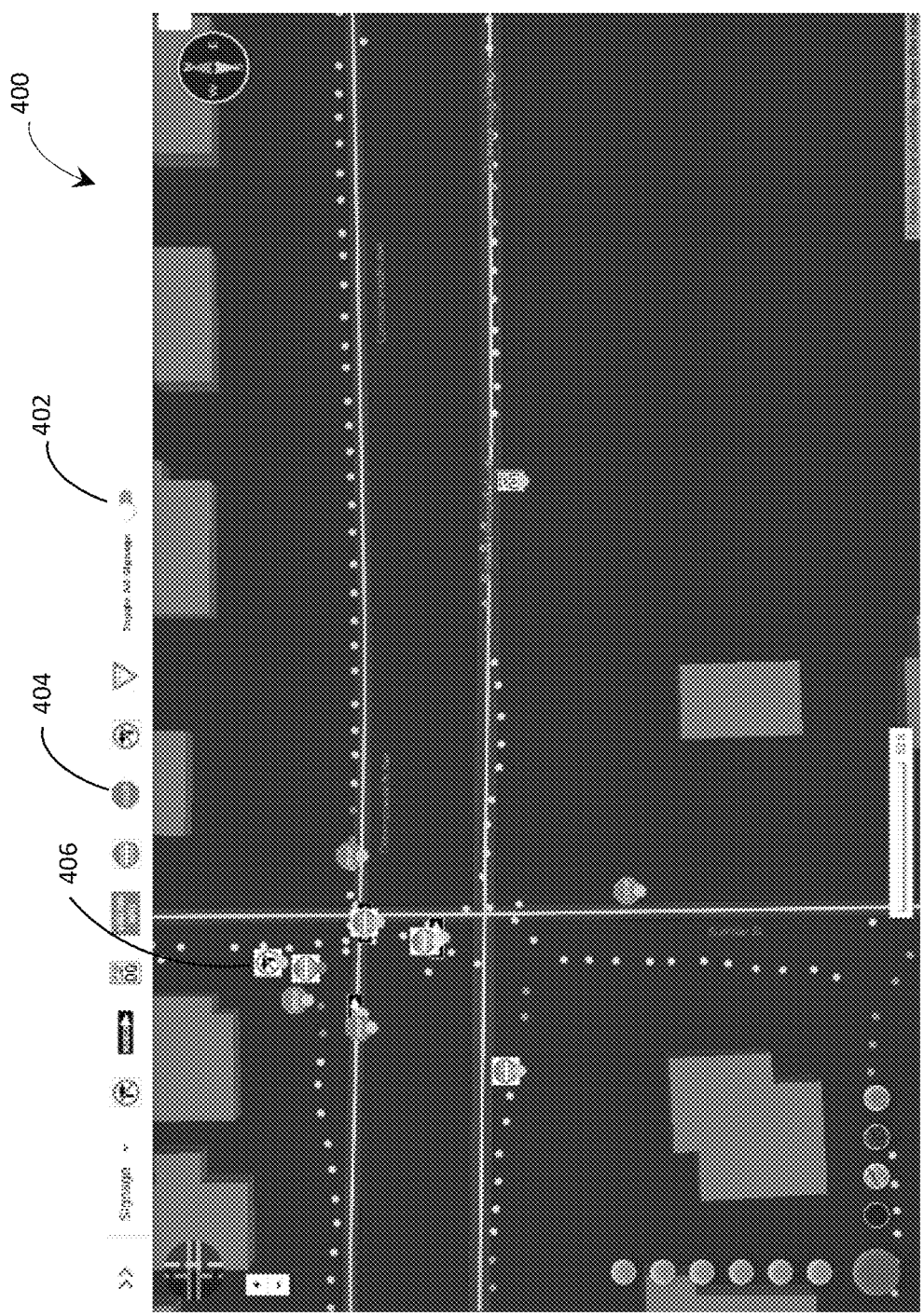
FIG. 4A shows an illustrative user interface 400, in accordance with some embodiments.

FIG. 4A shows an illustrative user interface 400, in accordance with some embodiments. The user interface 400 may be a user interface of the illustrative infrastructure management system 110 in the example of FIG. 1A. Similar to the illustrative user interface 130 in the example of FIG. 1C, the user interface 400 may show a map of road segments with a plurality of dots corresponding, respectively, to a plurality of regularly spaced locations along the road segments (e.g., one dot per meter, 2 meters, 3 meters, 4 meters, 5 meters, etc.). The dots may be color coded based on respective assessment scores, for example, as described above in connection with the example of FIG. 1B.

In the example of FIG. 4A, the user interface 400 includes a toggle 402, which, when activated, may cause one or more icons to be displayed along one or more road segments. Such an icon may correspond to a detected sign, and may have an appearance that indicates a type of the detected sign (e.g., stop sign, yield sign, do not enter sign, wrong way sign, one way sign, no left turn sign, no right turn sign, speed limit sign, etc.). Additionally, or alternatively, the icon may be displayed according to a location of the corresponding sign (e.g., as determined at act 210 in the example of FIG. 2).

In some embodiments, the user interface 400 may display an icon with an indication of an assessment result of a corresponding sign. For instance, an icon 406 may be displayed with a green dot, indicating that a corresponding no left turn sign is in good condition. Any suitable color coding scheme may be used, such as dark green for 1 (e.g., good condition), light green for 2 (e.g., minor damage), yellow for 3 (e.g., moderate damage), orange for 4 (e.g., significant damage), red for 5 (e.g., severe damage), etc. However, it should be appreciated that aspects of the present disclosure are not limited to using any particular scoring or color coding scheme, or any scoring or color coding scheme at all.

In some embodiments, the user interface 400 may allow a user to filter one or more icons to be displayed along one or more road segments. For instance, the user interface 400 may include a button 404, which may correspond to a signage type (e.g., stop sign). Such a button, when activated, may cause the user interface 400 to filter out icons corresponding to all signs except those of the corresponding signage type. However, it should be appreciated that aspects of the present disclosure are not limited to filtering icons in any particular manner, or at all. In some embodiments, icons may be filtered based on assessment score, in addition to, or instead of, signage type.

In some embodiments, the user interface 400 may allow a user to call up information associated with a sign. For instance, in response to a user clicking on an icon displayed along a road segment, the user interface 400 may display information associated with a corresponding sign. Any suitable information may be displayed, including, but not limited to, an image in which the sign is detected, an assessment score for the sign, a recommended type of maintenance for the sign, etc. (e.g., as determined in the example of FIG. 2).

Figure 4B:
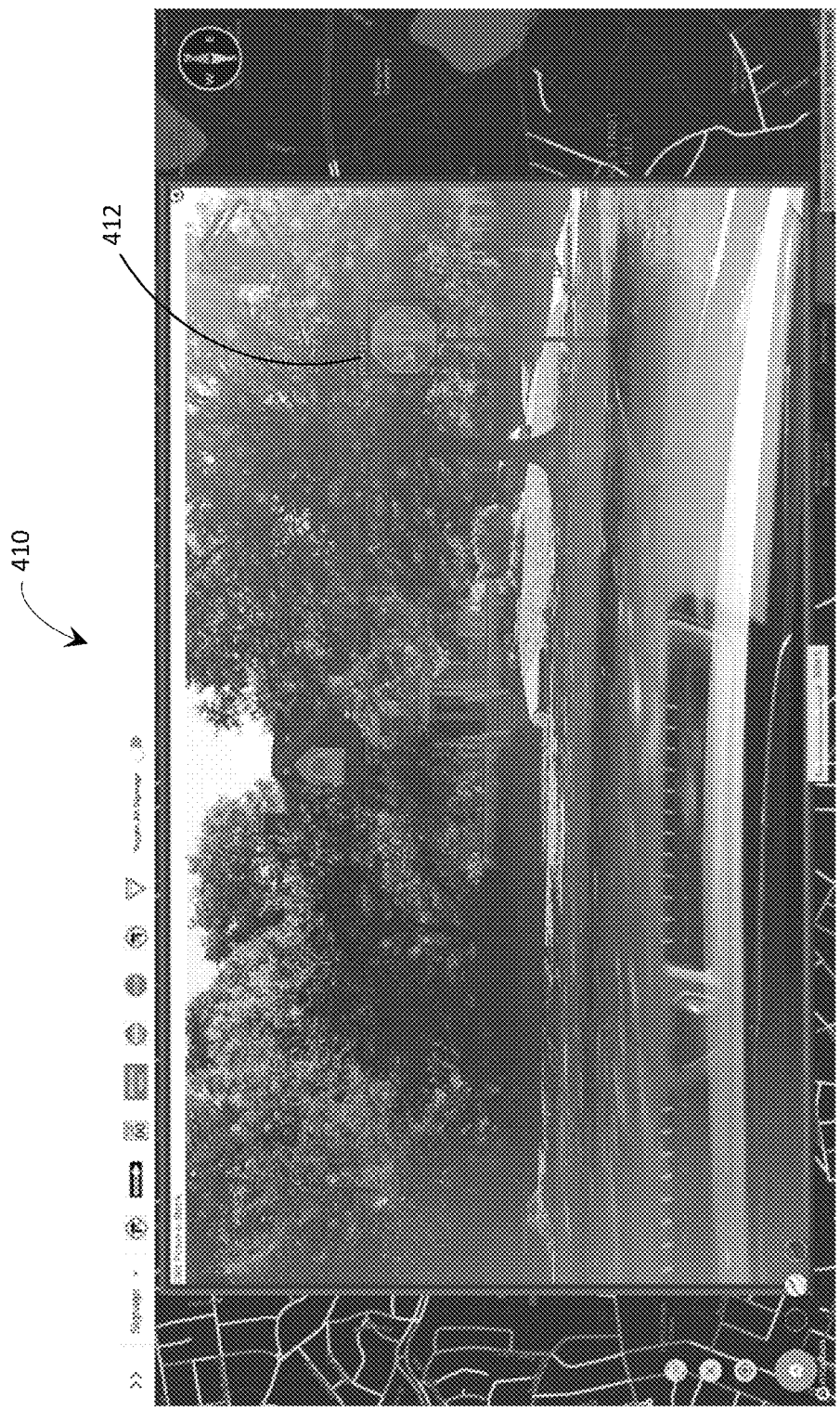
FIG. 4B shows an illustrative user interface 410, in accordance with some embodiments.

FIG. 4B shows an illustrative user interface 410, in accordance with some embodiments. In this example, an image in which a sign is detected is displayed to a user (e.g., in response to the user clicking a corresponding icon in the illustrative user interface 400 in the example of FIG. 4A). The sign may be highlighted to the user in a suitable manner, for instance, using a bounding box 412. Additionally, or alternatively, the sign may be annotated with relevant information, such as a type of the sign (e.g., stop sign), an identifier, etc.

In the example of FIG. 4B, the sign has been classified (e.g., by the illustrative infrastructure assessment system 100 in the example of FIG. 1A) as being damaged. For instance, a face of the sign may have faded and/or been bent (e.g., as a result of an accident, a storm, vandalism, etc.), and it may be recommended that the sign face be replaced. A human decision maker may examine the image via the user interface 410 to determine whether the sign has been properly classified.

The inventors have recognized and appreciated that geospatial metadata associated with sensor data may have limited accuracy. For instance, a GPS-enabled device may, on average, have errors of a few meters horizontally. In an urban or suburban environment with buildings, trees, etc., errors of 10-20 meters, or even greater, may be observed.

Accordingly, in some embodiments, one or more techniques may be provided to correct errors. For instance, one or more SfM techniques may be used to generate a 3D model of an object (e.g., an infrastructure asset) in one or more images (e.g., one or more image frames in a video captured by the illustrative data collection system 105 in the example of FIG. 1A), along with a camera pose (e.g., a camera position and/or a camera orientation) for each of the one or more images. Such a camera pose may be used to correct geospatial metadata associated with the corresponding image.

FIG. 5A shows illustrative positions of a camera relative to an object, in accordance with some embodiments. For instance, the illustrative data collection system 105 in the example of FIG. 1 may include a vehicle traveling along a road segment, and the camera may be attached to the vehicle in some suitable manner (e.g., mounted on a dashboard or a windshield of the vehicle). The object may be a sign installed next to the road segment at a position S.

In some embodiments, the vehicle may travel in a direction shown in FIG. 5A. A face of the sign may be perpendicular to the direction of travel, and may be visible in multiple image frames that are captured as the camera travels with the vehicle. For example, a first image frame may be captured when the camera is at position C1, a second image frame may be captured when the camera is at position C2, and a third image frame may be captured when the camera is at position C3.

Figure 5B:
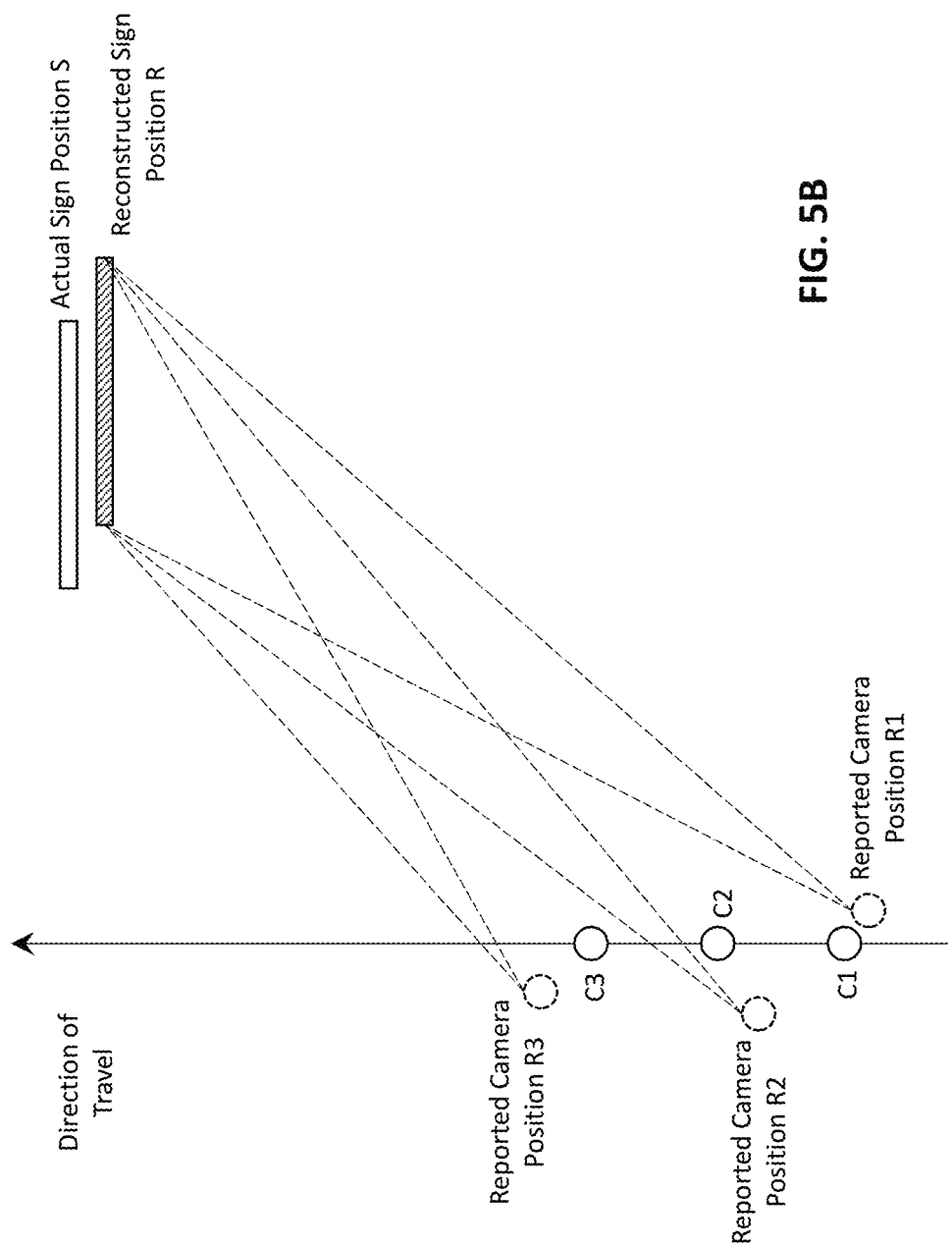
FIG. 5B shows illustrative reported positions of the camera in the example of FIG. 5A, in accordance with some embodiments.

FIG. 5B shows illustrative reported positions of the camera in the example of FIG. 5A, in accordance with some embodiments. For instance, due to GPS errors, geospatial metadata associated with the first image frame may indicate that the camera is at reported position R1, instead of the actual position C1. Similarly, geospatial metadata associated with the second image frame may indicate that the camera is at reported position R2, instead of the actual position C2, and geospatial metadata associated with the third image frame may indicate that the camera is at reported position R3, instead of the actual position C3.

In some embodiments, one or more SfM techniques may be used to generate a 3D point cloud from one or more image frames captured by the camera. For instance, geospatial metadata associated with the first image frame and geospatial metadata associated with the second image frame may be used to determine a relative camera motion (e.g., a relative rotation and/or a relative translation) between the first and second image frames. Additionally, or alternatively, geospatial metadata associated with the second image frame and geospatial metadata associated with the third image frame may be used to estimate relative motion of the camera (e.g., a relative rotation and/or a relative translation) between the second and third image frames. One or more of such relative motions, along with one or more measurements from corresponding image frames, may be used to compute a reconstructed position R of the sign.

In some embodiments, one or more SfM techniques may be used that output a camera pose (e.g., a camera position and/or a camera orientation) for each of the one or more image frames from which the point cloud is generated. The inventors have recognized and appreciated that such a camera pose may be used to correct geospatial metadata associated with the corresponding image frame.

Figure 5C:
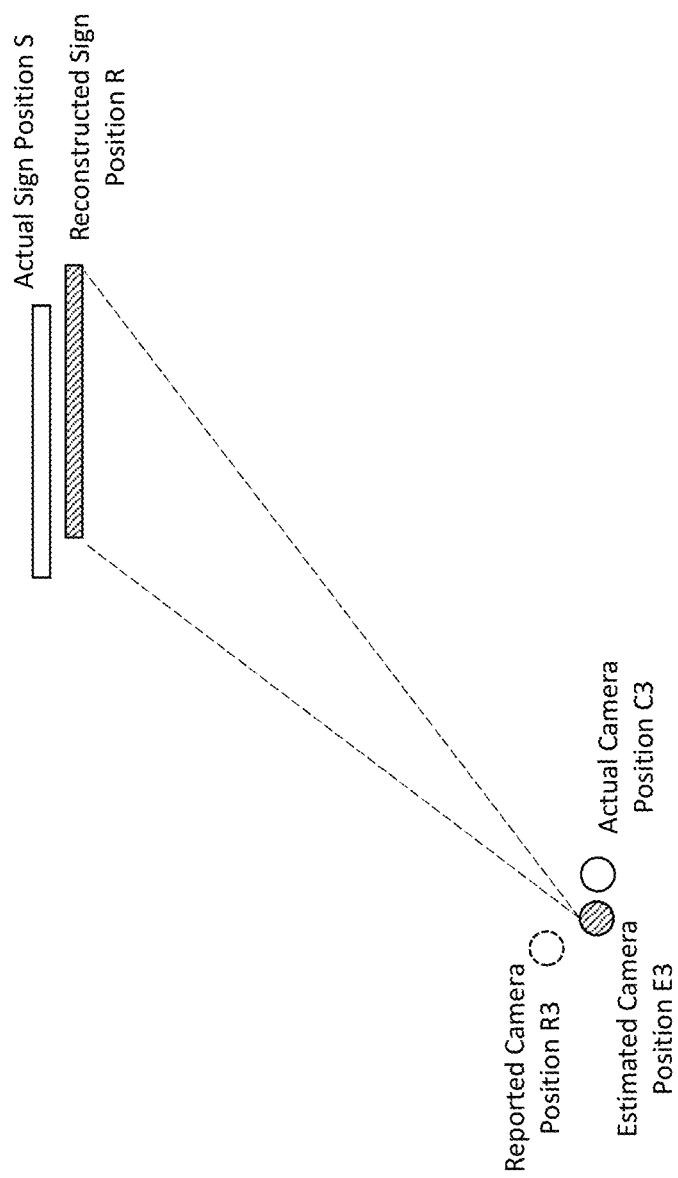
FIG. 5C shows an illustrative estimated position of the camera in the example of FIG. 5A, in accordance with some embodiments.

FIG. 5C shows an illustrative estimated position of the camera in the example of FIG. 5A, in accordance with some embodiments. For instance, one or more SfM techniques may be used that output an estimated camera position E3 for the third image in the example of FIG. 5A.

In some embodiments, the estimated camera position E3 may be expressed in a Cartesian coordinate system with origin at the Earth's center. Such Cartesian coordinates may be converted to latitude, longitude, and/or altitude, which may be used as corrected geospatial metadata for the third image.

Although a sign is shown in FIGS. 5A-C and described above in connection with camera position estimation, it should be appreciated that aspects of the present disclosure are not limited to estimating camera position in any particular manner, or at all. A scene captured in an image may include any object or combination of objects (e.g., buildings, infrastructure assets, etc.). Any suitable feature or combination of features of such object(s) may be tracked across multiple images. Measurements of the tracked feature(s) in the images may be used to estimate camera poses (e.g., camera positions and/or camera orientations) and/or coordinates of the tracked feature(s).

Figure 5D:
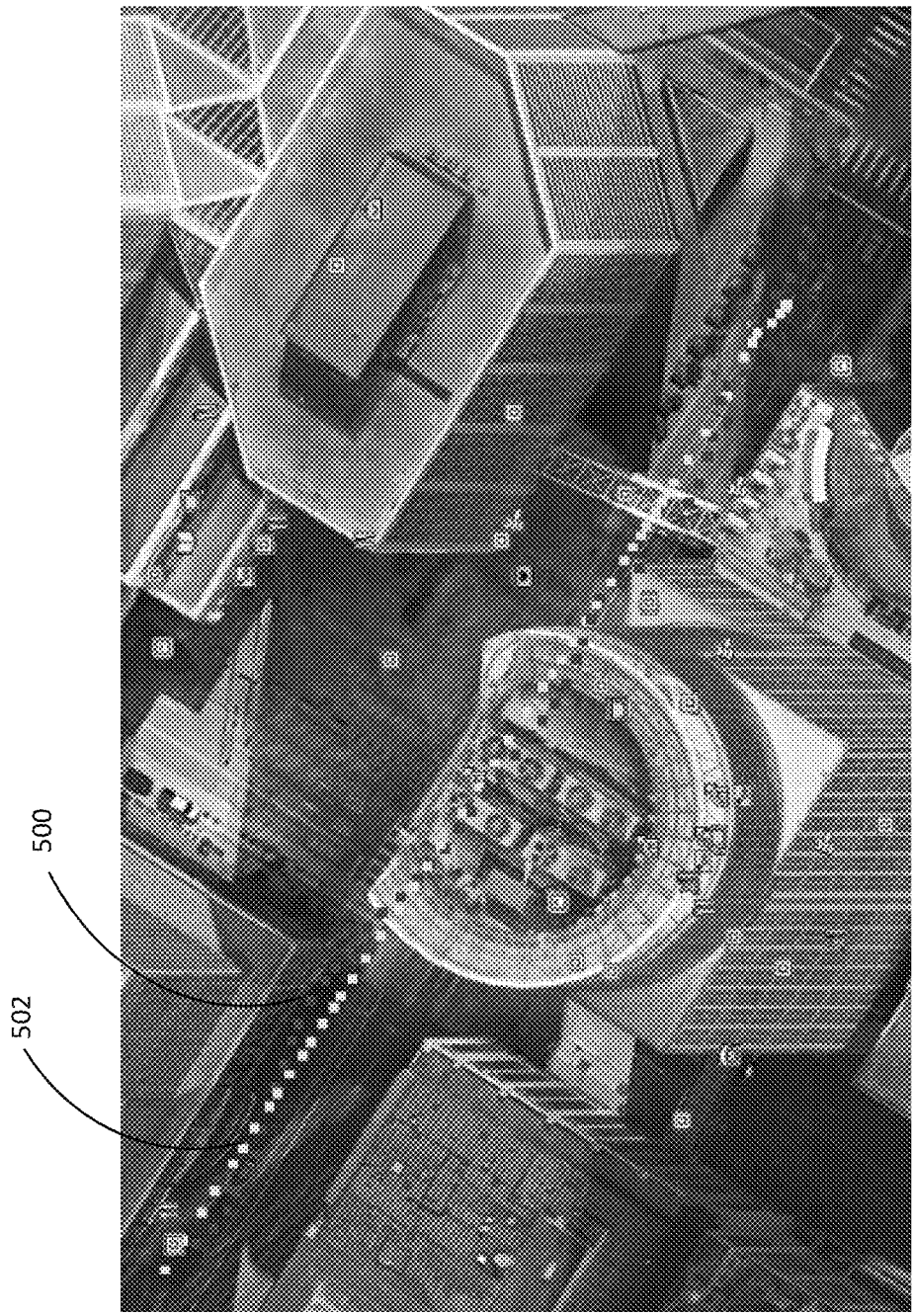
FIG. 5D shows illustrative reported camera positions 500 and illustrative estimated camera positions 502, in accordance with some embodiments.

FIG. 5D shows illustrative reported camera positions 500 and illustrative estimated camera positions 502, in accordance with some embodiments. In this example, a vehicle traveled along a road segment in an urban environment, and a camera attached to the vehicle (e.g., mounted on a dashboard or a windshield of the vehicle) captured a sequence of image frames. Each image frame may have a reported camera position, represented as a blue dot in FIG. 5D.

In some embodiments, one or more SfM techniques may be used to generate a point cloud based on the image frames. Additionally, or alternatively, the one or more SfM techniques may output an estimate camera pose (e.g., an estimated camera position and/or an estimated camera orientation) for each image frame.

In the example of FIG. 5D, the estimated camera positions 502 are represented as green dots, which form a relatively straight line consistent with the road segment on which the vehicle traveled. By contrast, the blue dots representing the reported camera positions 500 form a wavy line due to errors in geospatial metadata (e.g., GPS coordinates) associated with the image frames. Thus, the estimated camera positions 502 may be more accurate than the reported camera positions 500.

The inventors have recognized and appreciated that, SfM techniques, like many numerical estimation techniques, may suffer from various errors, such as those due to presence of noise in input data.

The inventors have further recognized and appreciated various challenges in data collection for infrastructure assessment. For instance, the illustrative data collection system 105 in the example of FIG. 1 may include a vehicle traveling along a road segment, and a video stream may be captured by a camera may be attached to the vehicle in some suitable manner (e.g., mounted on a dashboard or a windshield of the vehicle). Such data collection may be conducted by a non-expert driver, who may receive little or no guidance on how to conduct the data collection, other than simply to drive along one or more selected road segments.

Indeed, even if a driver does receive data collection guidance (e.g., driving along a selected route, maintaining steady speed, getting sufficiently close to infrastructure assets of interest, etc.), it may not always be practical to follow such guidance, because the driver may have to react to real world conditions. For example, the driver may encounter a temporary roadblock, and may have to turn around and find an alternative route. As another example, the driver may be unable to maintain a desired speed due to traffic. As yet another example, the driver may have to brake suddenly to avoid hitting a pedestrian. As yet another example, the driver may encounter a double parked car, and may have to cross into an opposite lane.

The inventors have recognized and appreciated that such real world conditions may lead to various irregularities in collected image data. Moreover, as discussed above, geospatial metadata (e.g., GPS coordinates) may have significant errors in an urban or suburban environment with densely positioned buildings, trees, etc. Accordingly, in some embodiments, techniques are provided for sampling image frames from a video stream to improve reconstruction accuracy, in spite of irregular and/or erroneous input data.

The inventors have further recognized and appreciated that some SfM techniques may be subject to a phenomenon known as drift, where small estimation errors accumulate over successive estimates. As more input data is processed (e.g., more image frames from a video stream), more estimates may be made, and accumulated errors may become significant, which may lead to erroneous reconstruction results.

Accordingly, in some embodiments, techniques are provided for processing input data in an appropriate manner, so that an effect of drift may be reduced. For instance, a desired amount of input data may be selected, so that there may be sufficient data to avoid inconclusive or spurious results, but not so much data that drift errors may dominate.

The inventors have recognized and appreciated that an amount of input data that is appropriate may be context dependent. For instance, an appropriate number of image frames to be sampled from a video stream captured by a camera may be dependent on how a vehicle carrying the camera was moving.

As an example, if the vehicle was at a stand-still, a small amount of input data may be appropriate. By contrast, if the vehicle was travelling at a steady speed, a larger amount of input data may be appropriate, whereas if the vehicle's orientation changed abruptly, an even larger amount of input data may be appropriate.

Figure 6A:
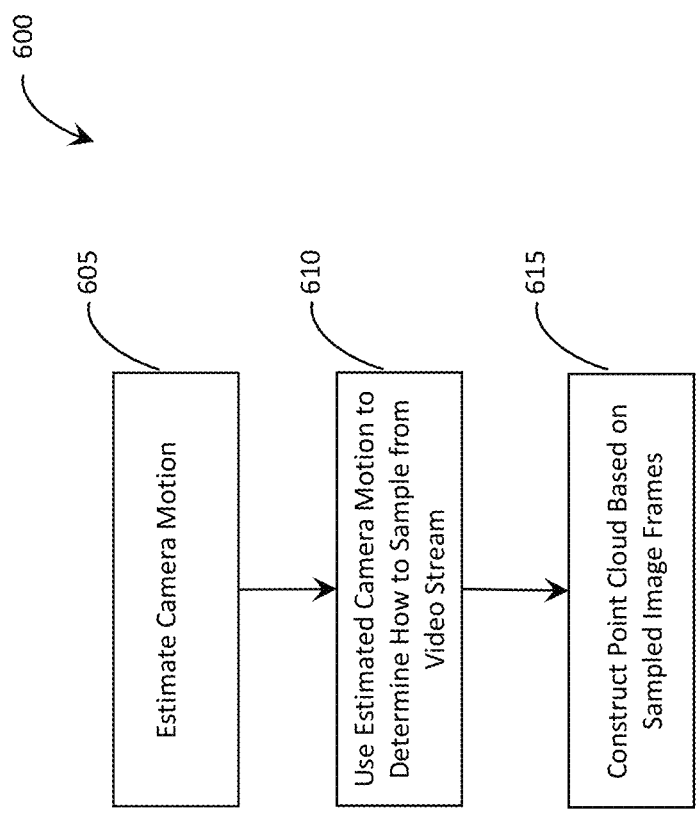
FIG. 6A shows an illustrative process 600 for sampling image frames, in accordance with some embodiments.

FIG. 6A shows an illustrative process 600 for sampling image frames, in accordance with some embodiments. For instance, the process 600 may be used by the illustrative infrastructure assessment system 100 in the example of FIG. 1A to sample one or more image frames from a video stream captured by a camera of the illustrative data collection system 105.

At act 605, the infrastructure assessment system 100 may estimate camera motion. In some embodiments, one or more image-based motion estimation techniques (e.g., optical flow) may be used to estimate how the camera was moving. For instance, one or more features may be detected from, and/or tracked across, multiple image frames in the video stream to determine if the camera was turning, or otherwise moving in an unusual way (e.g., not at rest or simply translating along a straight line at a steady speed). Additionally, or alternatively, one or more characteristics of the camera's movement (e.g., translational velocity, translational acceleration, rotational velocity, rotational acceleration, etc.) may be determined.

It should be appreciated that aspects of the present disclosure are not limited to using an image-based technique to estimate camera motion. In some embodiments, non-image data from one or more sensors (e.g., speedometer, GPS, compass, accelerometer, gyroscope, etc.) may be used in addition to, or instead of, image data. For instance, it may be determined that the camera is not translating or rotating if a speedometer output indicates zero velocity, a GPS output indicates no change in coordinates, and/or an optical flow output indicates no egomotion of the camera.

At act 610, the infrastructure assessment system 100 may use an estimated camera motion obtained at act 605 to determine how to sample image frames from the video stream. For instance, if it is determined at act 605 that the camera is simply translating roughly along a straight line at a steady speed, image frames may be sampled at regular distance intervals (e.g., one frame per meter, 2 meters, 3 meters, 4 meters, 5 meters, etc.).

In some embodiments, a sampling frequency may be selected to provide sufficient data to avoid inconclusive or spurious results, but not so much data that drift errors may dominate. For instance, a higher temporal sampling frequency may be selected if the camera is traveling at a higher speed, and a lower temporal sampling frequency may be selected if the camera is traveling at a lower speed, so as to maintain a selected spatial sampling frequency (e.g., one frame per a certain number of meters).

Additionally, or alternatively, it may be determined at act 605 that the camera is not moving. For instance, a data collection vehicle onto which the camera is mounted may be stopped at an intersection with a stop sign or a traffic light. Accordingly, a smaller number of image frames (e.g., just one or two) may be sampled for a duration of the stop.

Additionally, or alternatively, it may be determined at act 605 that the camera is experiencing an abrupt movement. For instance, the data collection vehicle may be making a U turn or a 3-point turn. Accordingly, a larger number of image frames may be sampled for a duration of the abrupt movement (e.g., up to a frame rate of the video stream).

In some embodiments, a sampling frequency may be selected based on an abruptness of the camera's movement. For instance, a higher temporal sampling frequency may be selected if the camera is rotating more quickly, and a lower temporal sampling frequency may be selected if the camera is rotating more slowly.

At act 615, a point cloud may be constructed (e.g., using one or more SfM techniques) based on the image frames sampled at act 610. Such a point cloud may be used in any suitable manner. For instance, the point cloud may be used to geolocate detected infrastructure assets, as described in connection with the examples of FIGS. 4A-B. Additionally, or alternatively, the point cloud may be used to correct geospatial metadata, as described in connection with the examples of FIGS. 5A-D. Additionally, or alternatively, the point cloud may be used to assess conditions of pavement surfaces, as described in connection with the examples of FIGS. 7A-F.

Although the inventors have recognized and appreciated various advantages of adaptive sampling of image frames based on camera motion, aspects of the present disclosure are not limited to adaptive sampling in any particular manner, or at all. In some embodiments, image frames may be adaptively sampled based on one or more detected features, in addition to, or instead of, camera motion.

The inventors have recognized and appreciated that, in some instances, the same object (e.g., the same infrastructure asset) may be detected multiple times. For instance, as a vehicle with a camera mounted thereon travels along a road, a sign may come into the camera's field of view, and may remain there for some period of time (e.g., several seconds), until the vehicle drives past the sign. Thus, the sign may be detected in multiple image frames captured by the camera.

The inventors have recognized and appreciated that it may be desirable to determine whether two object instances detected, respectively, from two images are likely to represent the same object. Such matching may facilitate inventorying infrastructure assets, as described in connection with the example of FIG. 2.

FIG. 6B shows an illustrative process 650 for matching detected object instances, in accordance with some embodiments. For instance, the process 650 may be used by the illustrative infrastructure assessment system 100 in the example of FIG. 1A to determine whether two or more object instances detected from a video stream captured by a camera of the illustrative data collection system 105 correspond to the same object.

The object instances in question may be detected in any suitable manner. For example, one or more image frames from the video stream may be submitted to an object detection service, along with one or more object types to be detected (e.g., stop sign, traffic light, fire hydrant, etc.) The object detection service may apply any suitable object detection technique to each image, and may return one or more sets of pixels corresponding, respectively, to detected object instances. Each such plurality of pixels may be identified by a bounding box, and may be associated with an object type.

At act 655, the infrastructure assessment system 100 may identify a first plurality of points corresponding to a first detected object instance. For instance, one or more SfM techniques may be used to generate a 3D point cloud from the one or more image frames and/or one or more other image frames from the video stream. A first plurality of pixels corresponding to the first detected object instance may then be mapped to a first plurality of points in the point cloud.

Similarly, at act 660, the infrastructure assessment system 100 may identify a second plurality of points corresponding to a second detected object instance. For instance, a second plurality of pixels corresponding to the second detected object instance may be mapped to a second plurality of points in the point cloud used in act 655.

The inventors have recognized and appreciated that, in some instances, a plurality of points corresponding to a plurality of pixels of a detected object instance may include one or more points that likely to be spurious. For example, the plurality of pixels may include one or more pixels representing another object that happen to be inside a bounding box for the detected object instance.

Accordingly, in some embodiments, the first and/or second pluralities of points may be filtered in some suitable manner. For instance, the first and second object instances may be of the same object type, which may have a known shape and/or a known size. The known shape and/or the known size may be used to construct a 3D model for the object type, and a suitable shape fitting technique may be used to position and/or orient the 3D model to fit the first or second plurality of points. One or more points that do not sufficiently fit the 3D model (e.g., more than a threshold distance away) may be determined to be likely spurious, and therefore may be filtered out.

At act 665, the infrastructure assessment system 100 may determine an extent of overlap between the first and second pluralities of points. For instance, first and second convex hulls may be obtained, respectively, for the first and second pluralities of points. The infrastructure assessment system 100 may then determine an extent of overlap between the first and second convex hulls. As an example, an intersection of the convex hulls may be compared against a union of the convex hulls, to determine a percentage of overlap.

At act 670, the infrastructure assessment system 100 may determine, based on the extent of overlap from act 665, whether the first and second object instances likely correspond to the same object. For instance, the extent of overlap may be compared against a selected threshold, and the first and second object instances may be matched if the extent of overlap is above the selected threshold. Any suitable threshold may be used, such as 5%, 10%, 15%, 20%, 25%, etc.

The inventors have recognized and appreciated that, in some instances, even a small overlap threshold (e.g., between 5% and 15%, such as 10%) may provide accurate matching. In that respect, the inventors have recognized and appreciated that most infrastructure assets may be located in relatively sparse regions in 3D space, so that even a small amount of overlap may indicate that the same infrastructure asset is being detected. This may be particularly true if relatively few infrastructure assets are expected to be detected. For example, if detection is performed for a certain infrastructure asset type, such as a signage type, it may be unlikely that two signs of the same type are close to each other. Therefore, two detected instances of that signage type may likely correspond to the same sign, even if the two instances overlap only by a small amount.

In some embodiments, in response to determining that the first and second object instances likely correspond to the same object, the infrastructure assessment system 100 may merge the first and second plurality of points. For instance, the infrastructure assessment system 100 may obtain a combined plurality of points as a union of the first and second plurality of points.

In some embodiments, the first and second object instances may be detected, respectively, from first and second image frames in a sequence of image frames. The infrastructure assessment system 100 may repeat the acts 660, 665, and 670 for each subsequent image frame. For instance, the infrastructure assessment system 100 may determine an extent of overlap between the combined plurality of points (obtained by merging the first and second plurality of points) and a third plurality of points corresponding to a third object instance detected from a third image in the sequence, where the third object instance is of the same type as the first and second object instances. If there is sufficient overlap, the infrastructure assessment system 100 may merge the third plurality of points with the combined plurality of points, thereby obtaining a new combined plurality of points. This may be repeated until an image frame is encountered with no object instance of sufficient overlap with a current combined plurality of points.

While various implementation details are described above in connection with the example of FIG. 6B, it should be appreciated that such details are provided herein solely for purposes of illustration. For instance, aspects of the present disclosure are not limited to determining an extent of overlap based on convex hulls. Any suitable measure of spatial overlap may be used, such as a percentage of overlap determined by comparing an intersection of the first and second pluralities of points against a union of the first and second pluralities of points.

As described above in connection with the examples of FIGS. 1A-C, the illustrative infrastructure assessment system 100 may use images captured by the illustrative data collection system 105 to assess conditions of pavement surfaces on one or more road segments. The inventors have recognized and appreciated that such an assessment may be facilitated by applying one or more surface reconstruction techniques. For instance, in some embodiments, a 3D point cloud may be generated from one or more images of road pavement. In turn, a 3D surface representing the road pavement may be reconstructed from the point cloud.

Any suitable surface reconstruction technique or combination of such techniques may be used. For instance, a polygon mesh (e.g., a triangle mesh) may be built using points in a 3D point cloud. Additionally, or alternatively, a 3D volume may be generated from the point cloud, and a 3D surface may be reconstructed from the 3D volume.

Figure 7A:
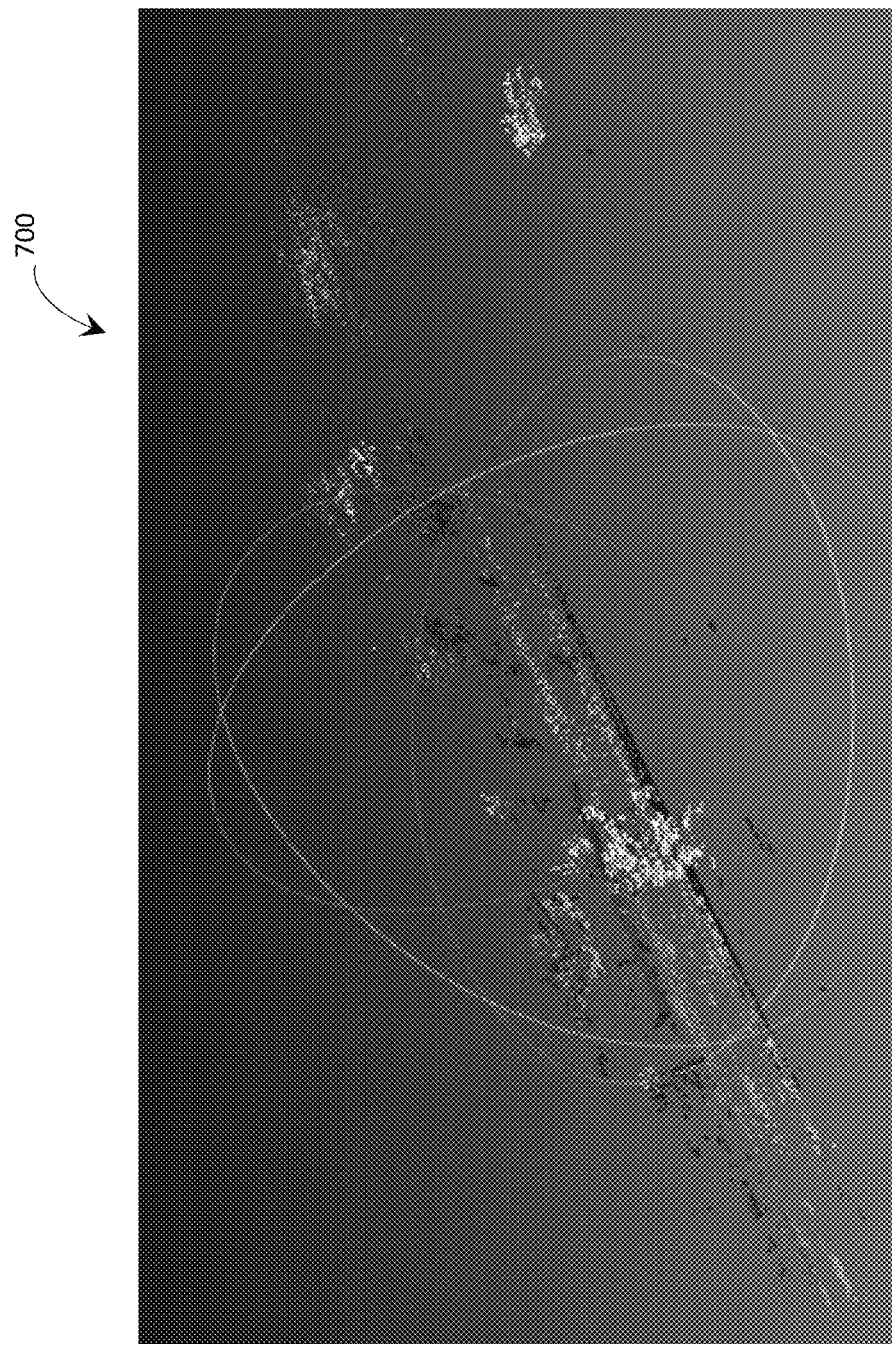
FIG. 7A shows a bird's eye view of illustrative pixels 700, in accordance with some embodiments.

FIG. 7A shows a bird's eye view of illustrative pixels 700, in accordance with some embodiments. The pixels 700 may be from one or more images captured by the illustrative data collection system 105 in the example of FIG. 1A. The one or more images may be used to generate a 3D point cloud (e.g., using one or more SfM techniques), whereby each of the pixels 700 may be tracked across multiple images, and/or mapped to a point in the point cloud.

Figure 7B:
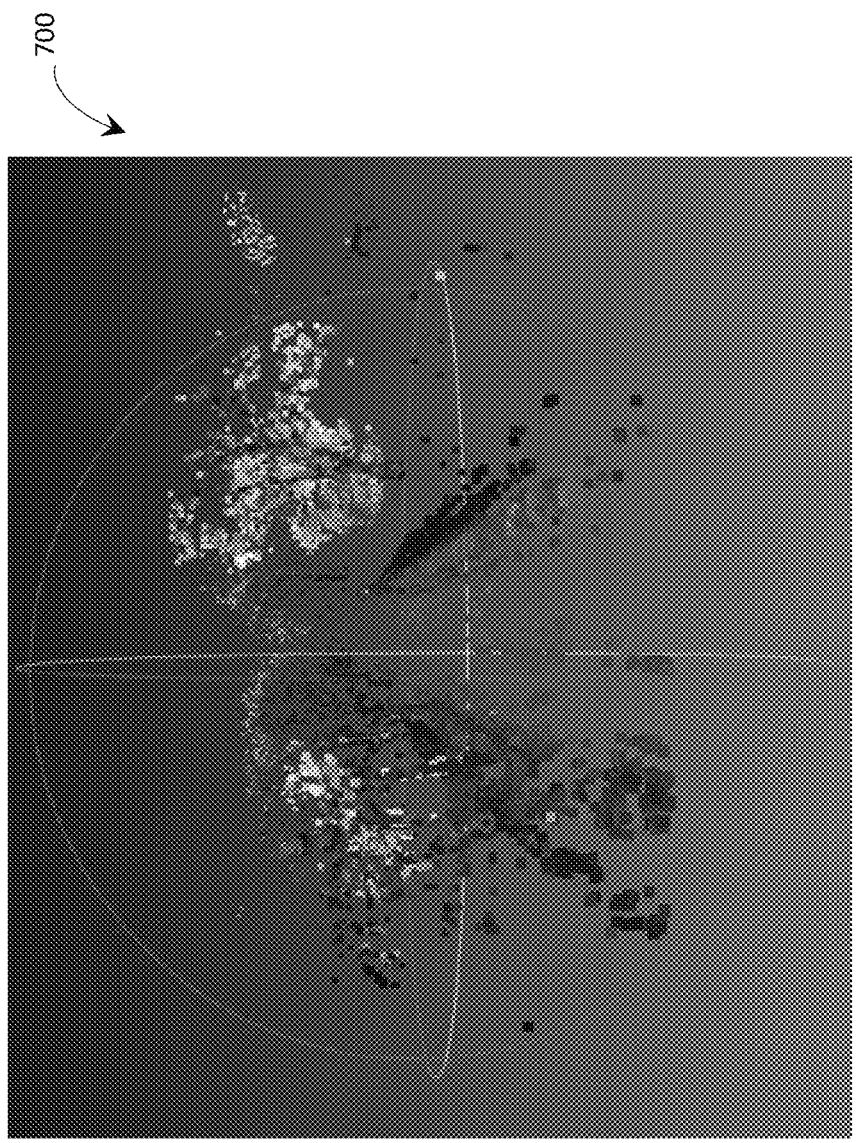
FIG. 7B shows a driver view of the illustrative pixels 700 in the example of FIG. 7A, in accordance with some embodiments.

FIG. 7B shows a driver view of the illustrative pixels 700 in the example of FIG. 7A, in accordance with some embodiments. In this view, it can be seen that some pixels shown in brown represent road pavement, whereas some pixels shown in grey represent other objects such as trees.

In some embodiments, each of the pixels 700 may have an associated surface normal. Such a surface normal may be computed in any suitable manner. For instance, a pixel may be mapped to a point in a 3D point cloud (e.g., as described in connection with FIG. 7A). A plurality of nearby points in the point cloud (e.g., three or more closest points) may be fitted onto a plane (e.g., by minimizing a sum of quadratic distances). A surface normal for the pixel may then be obtained based on the plane.

The inventors have recognized and appreciated that surface normals of pixels representing road pavement are likely to be vertical, whereas surface normals of pixels representing other objects are less likely to be vertical. Accordingly, the pixels 700 may be filtered based on surface normal, leaving only those pixels for which surface normals are vertical or near vertical.

Figure 7C:
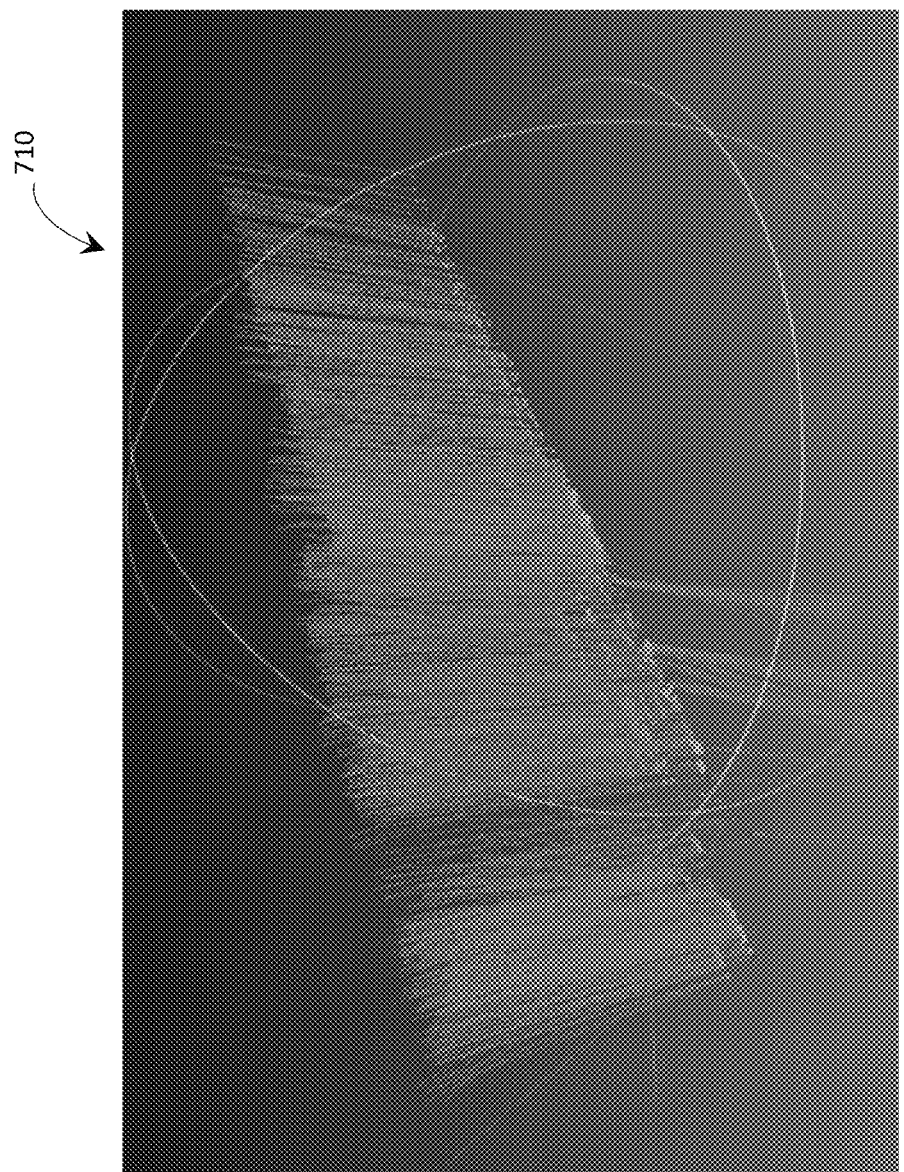
FIG. 7C shows illustrative pixels 710, in accordance with some embodiments.

FIG. 7C shows illustrative pixels 710, in accordance with some embodiments. The pixels 710 may result from filtering the illustrative pixels 700 in the example of FIG. 7A based on surface normal. For example, all pixels with surface normals greater than a threshold angle may be filtered out.

A threshold angle may be selected in any suitable manner. For instance, in some embodiments, multiple threshold angles may be used to filter pixels in a sample image, resulting in multiple sets of filtered pixels. Additionally, or alternatively, a segmentation model may be applied to the sample image to identify a plurality of pixels that are likely to represent road pavement. The sets of filtered pixels may then be compared, respectively, against the plurality of segmented pixels. A plurality of filtered pixels that best matches the plurality of segmented pixels may be identified, and the corresponding threshold angle may be selected. However, it should be appreciated that aspects of the present disclosure are not limited to filtering pixels in any particular manner, or at all.

Figure 7D:
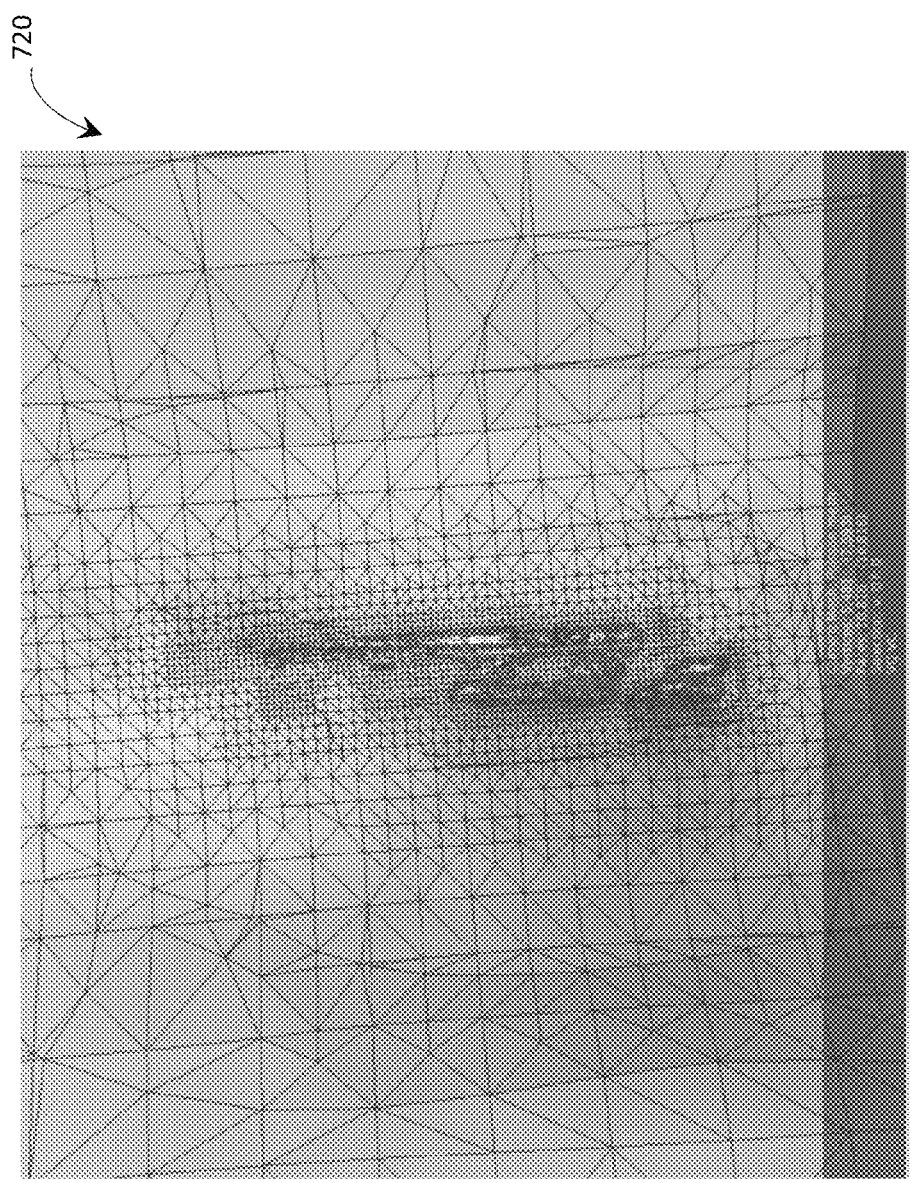
FIG. 7D shows a top view of an illustrative triangle mesh 720, in accordance with some embodiments.

FIG. 7D shows a top view of an illustrative triangle mesh 720, in accordance with some embodiments. The triangle mesh 720 may be generated from the illustrative filtered pixels 710 in the example of FIG. 7C. For instance, the triangle mesh 720 may be generated using a Poisson reconstruction technique, and may approximate a smooth surface with surface normals matching those of the filtered pixels 710. However, it should be appreciated that aspects of the present disclosure are not limited to using any particular surface reconstruction technique, or any such technique at all.

Figure 7E:
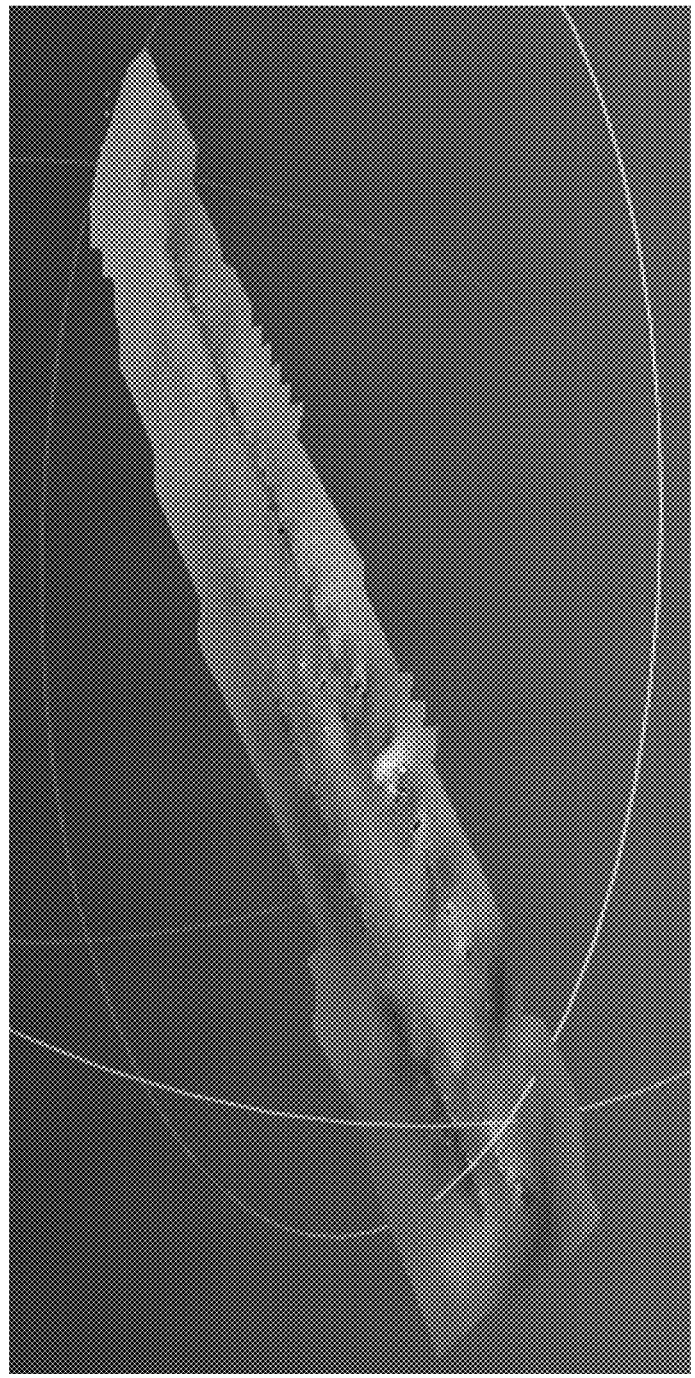
FIG. 7E shows a bird's eye view of an illustrative reconstructed surface 730, in accordance with some embodiments.

FIG. 7E shows a bird's eye view of an illustrative reconstructed surface 730, in accordance with some embodiments. The reconstructed surface 730 may be rendered based on a polygon mesh such as the illustrative triangle mesh 720 in the example of FIG. 7D. For instance, each face of the polygon mesh may be mapped to one of the illustrative filtered pixels 710 in the example of FIG. 7C, and may be rendered using a color of the corresponding pixel.

In some embodiments, the reconstructed surface 730 may be analyzed to assess a condition of the road pavement represented by the filtered pixels 710. For instance, a synthetic image may be generated from the reconstructed surface 730 at a selected camera pose (e.g., directly above the road pavement at a selected location and/or a selected height). The synthetic image may then be provided as input to a machine learning model, which may analyze the synthetic image, and output one or more classification labels indicating a condition of the road pavement. Such a machine learning model may be referred to herein as a pavement assessment model.

In some embodiments, classification labels output by a pavement assessment model may include numerical scores. For instance, a pavement assessment model may output an assessment score of 1 for good condition, 2 for minor damage, 3 for moderate damage, 4 for significant damage, 5 for severe damage). However, it should be appreciated that aspects of the present disclosure are not limited to using any particular scoring scheme, or any scoring scheme at all. For instance, in some embodiments, a pavement assessment model may output a classification label indicating a recommended type of maintenance (e.g., reconstructing entire road surface, crack sealing, etc.).

Additionally, or alternatively, a segmentation model may be provided to detect, from an image, a plurality of pixels that are likely to represent a portion of an infrastructure asset exhibiting a certain damage type and/or a certain damage subtype. For instance, a segmentation model may analyze an input image, and output one or more detected pavement surfaces by labeling one or more sets of pixels in the input image as exhibiting, respectively, one or more damage types and/or one or more damage subtypes (e.g., "longitudinal_cracking_0," "longitudinal_cracking_1," etc., "transverse_cracking_0," "transverse_cracking_1," etc., "pothole_0," "pothole_1," etc.).

A pavement assessment and/or segmentation model may be implemented in any suitable manner. For example, a pavement assessment and/or segmentation model may include a convolutional neural network (CNN), which may be trained using pavement images that have been labeled by humans. An illustrative CNN architecture is shown in FIG. 3 and described above. However, it should be appreciated that aspects of the present disclosure are not limited to using any particular type of machine learning model, or any machine learning model at all, to assess road pavement or to perform segmentation.

It should also be appreciated aspects of the present disclosure are not limited to generating a synthetic image from the reconstructed surface 730. Additionally, or alternatively, the reconstructed surface 730 be provided directly as input to a pavement assessment model.

Figure 7F:
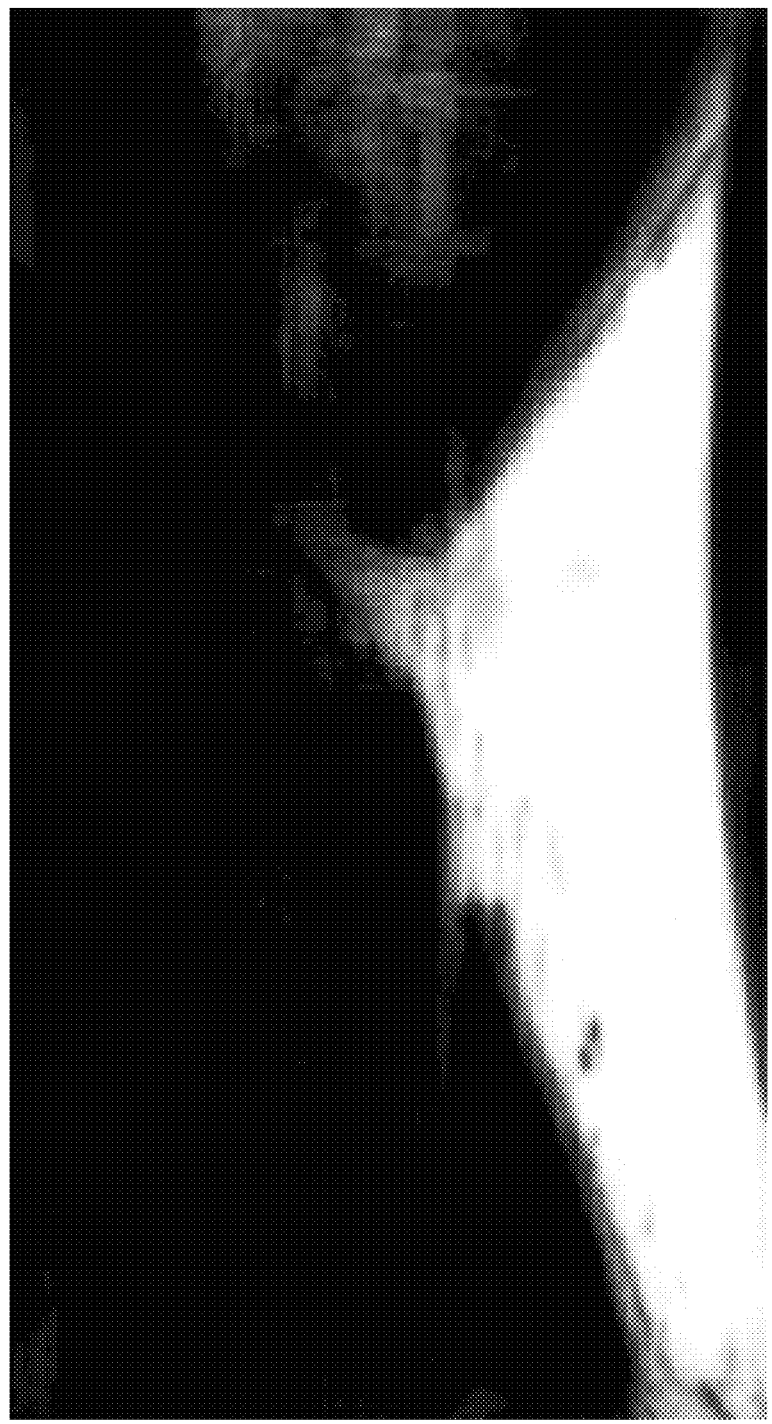
FIG. 7F shows another driver view of the illustrative pixels 700 in the example of FIG. 7A, in accordance with some embodiments.

FIG. 7F shows another driver view of the illustrative pixels 700 in the example of FIG. 7A, in accordance with some embodiments. In this example, the pixels 700 are shown in greyscale, where an intensity of each pixel may indicate a confidence level that the pixel represents road pavement. For instance, a pixel may be shown with a higher intensity because the pixel is deemed more likely to represent road pavement.

In some embodiments, a segmentation model may be applied to the pixels 700, whereby each pixel may be assigned a confidence level that the pixel represents road pavement. Additionally, or alternatively, pixels may be segmented based on color. For instance, regions in a color space may be associated, respectively, with different pavement types (e.g., concrete, asphalt, cobblestone, brickwork, etc.). These color regions may be used to assign classification labels to pixels.

In some embodiments, confidence levels assigned by a segmentation model may be used to identify a region of pixels that is likely to represent road pavement. Such a region may, in some instances, include one or more pixels with low confidence levels. For instance, a region may include a small number of pixels with low confidence levels (e.g., confidence levels lower than a selected threshold) dispersed among a large number of pixels with high confidence levels (e.g., confidence levels higher than the selected threshold). One or more suitable statistics may be used to determine whether the low confidence pixels are sufficiently sparse (e.g., no more than a selected number of pixels with low confidence levels in any contiguous block of a selected size). If the low confidence pixels are sufficiently sparse, the region, as a whole, may be deemed likely to represent road pavement, despite the low confidence pixels.

In some embodiments, a region of pixels that is likely to represent road pavement may be used in surface reconstruction. For instance, pixels in the region may be mapped to points in a 3D point cloud (e.g., as described above in connection with the example of FIG. 7A). A suitable surface reconstruction technique may then be applied to the resulting points (e.g., as described above in connection with the example of FIG. 7D).

As discussed above in connection with the examples of FIGS. 1A-B, a camera mounted on a dashboard or a windshield of a vehicle may be used to collect one or more images as the vehicle travels along a road segment, and an assessment score may be assigned to each such image. Thus, such an image may show a pavement surface as seen from a driver's perspective.

The inventors have recognized and appreciated various disadvantages of using driver-view images to assess pavement surfaces. For instance, in some embodiments, driver-view images may be collected at regular distance intervals (e.g., one image per meter, 2 meters, 3 meters, 4 meters, 5 meters, etc.), but each such image may show pavement surface beyond a corresponding interval. As a result, it may be challenging to determine whether an instance of damage appearing in an image should be attributed to a current interval, or a next interval.

Moreover, when imaged by a camera that is closer, an instance of damage may appear larger than when imaged by a camera that is farther away. As a result, images of a same pavement surface that are taken during different data collection trips may be assigned different assessment scores because the camera positions may be different.

Figure 8A:
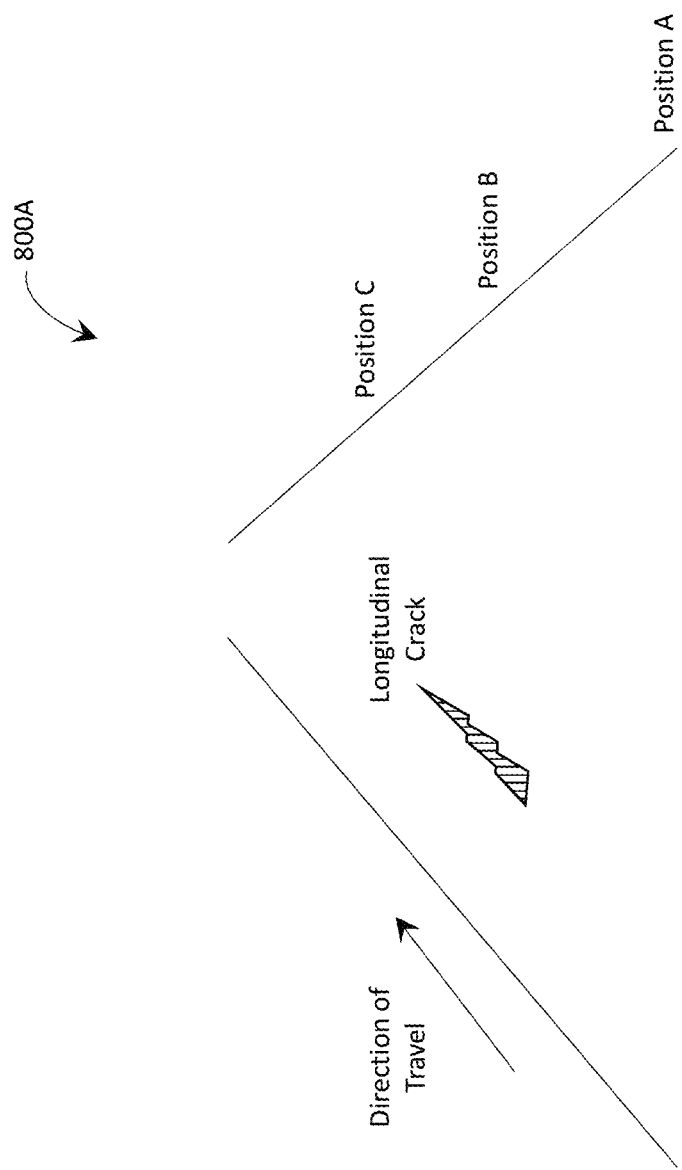
FIGS. 8A-B represent, respectively, illustrative driver-view images 800A-B taken at positions A and B along a road segment, in accordance with some embodiments.
Figure 8B:
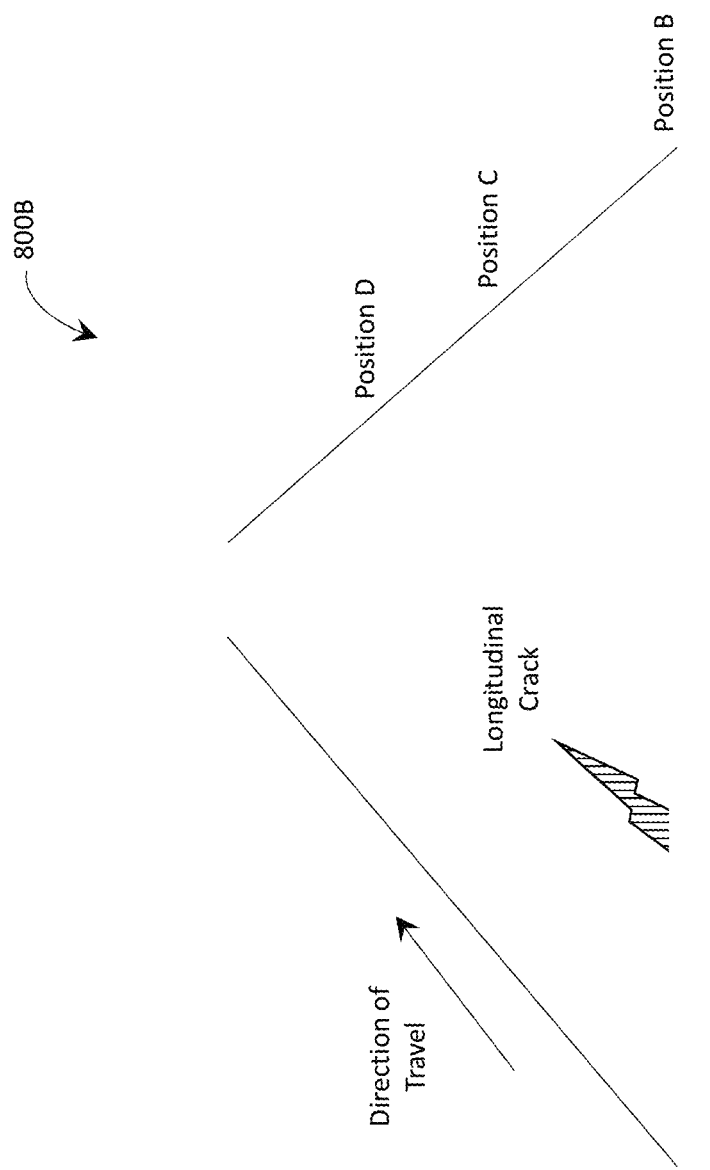

FIGS. 8A-B represent, respectively, illustrative driver-view images 800A-B taken at positions A and B along a road segment, in accordance with some embodiments. The images 800A-B may be taken by a camera mounted on a vehicle traveling along the road segment. The positions A and B may be, for instance, 3 meters apart.

In this example, a pavement surface of the road segment may have a longitudinal crack, about half of which may be between the positions A and B. The other half of the longitudinal crack may be beyond the position B. Thus, in the image 800A, the crack may be entirely visible, and may appear relatively small. By contrast, in the image 800B, the crack may appear relatively large, and may be partially obscured by a hood of the vehicle on which the camera is mounted.

The inventors have recognized and appreciated that there may be ambiguity as to whether the longitudinal crack in this example should be attributed to position A or position B. If both images 800A-B are used in their entireties for pavement assessment, the longitudinal crack may be double counted to some extent, potentially leading to a higher aggregate score for the road segment (e.g., indicating more severe damage).

Moreover, there may be ambiguity as to one or more dimensions of the longitudinal crack in this example (e.g., width, length, and/or depth). For instance, if the image 800A is used, as opposed to the image 800B, a lower assessment score may be obtained (e.g., indicating less serve damage), because the longitudinal crack may appear smaller and/or shallower in the image 800A than in the image 800B.

Accordingly, in some embodiments, the images 800A-B may be used to generate a 3D model (e.g., a 3D point cloud) for the pavement surface. The 3D model may be used to generate one or more synthetic images of the pavement surface, which may in turn be used for pavement assessment. For instance, the one or more synthetic images may be provided as input to one or more machine learning models for pavement assessment and/or segmentation, in addition to, or instead of, the images 800A-B.

Figure 8C:
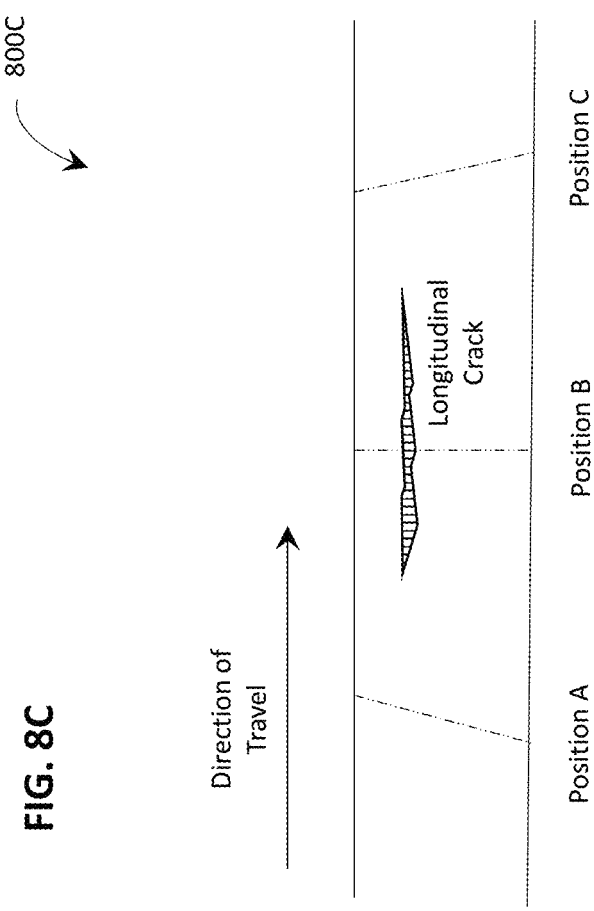

FIGS. 8C-D represent, respectively, illustrative synthetic images 800C-D, in accordance with some embodiments. In this example, the synthetic image 800C shows a view of the pavement surface as if the camera was held by a pedestrian standing at the position B, facing the road segment, whereas the synthetic image 800D shows a view of the pavement surface as if the camera was directly above the road segment at the position B. In some embodiments, one or both of the synthetic images 800C-D may be provided as input to a pavement assessment and/or segmentation model, which may lead to more consistent assessment across different intervals of the road segment.

Figure 9A:
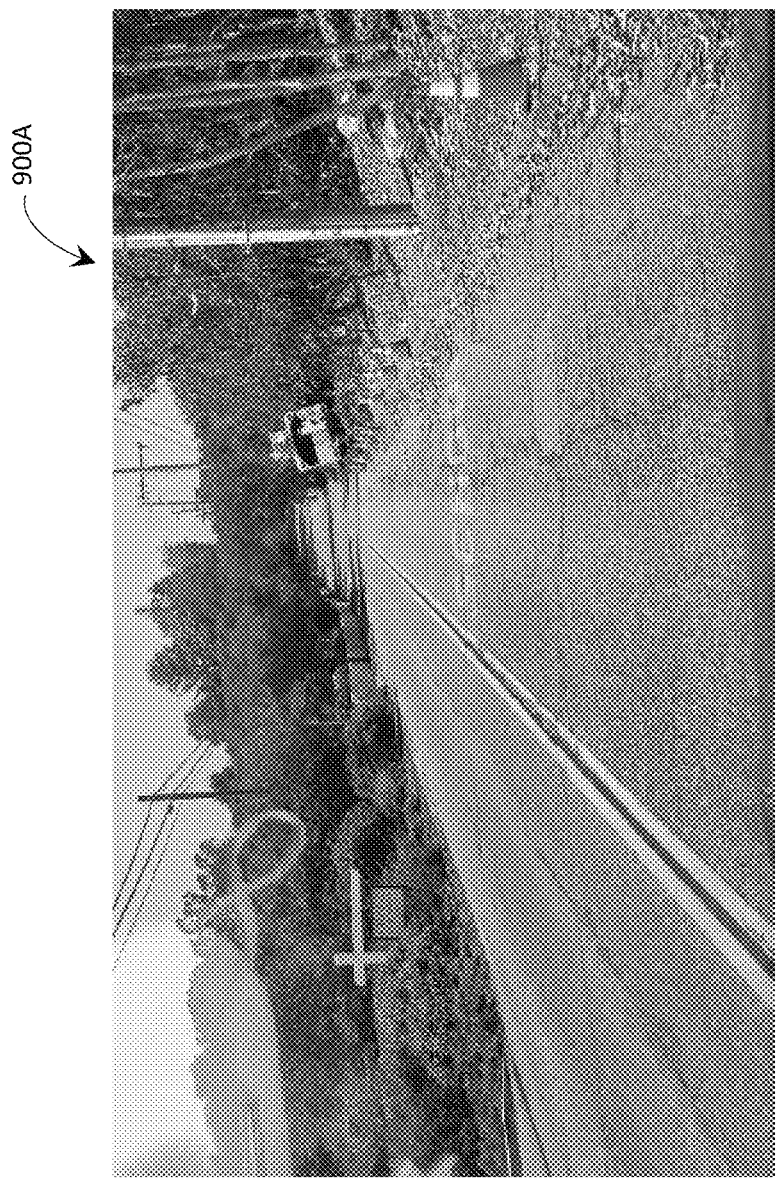
FIGS. 9A-C show, respectively, illustrative actual driver-view images 900A-C taken along a road segment, in accordance with some embodiments.
Figure 9B:
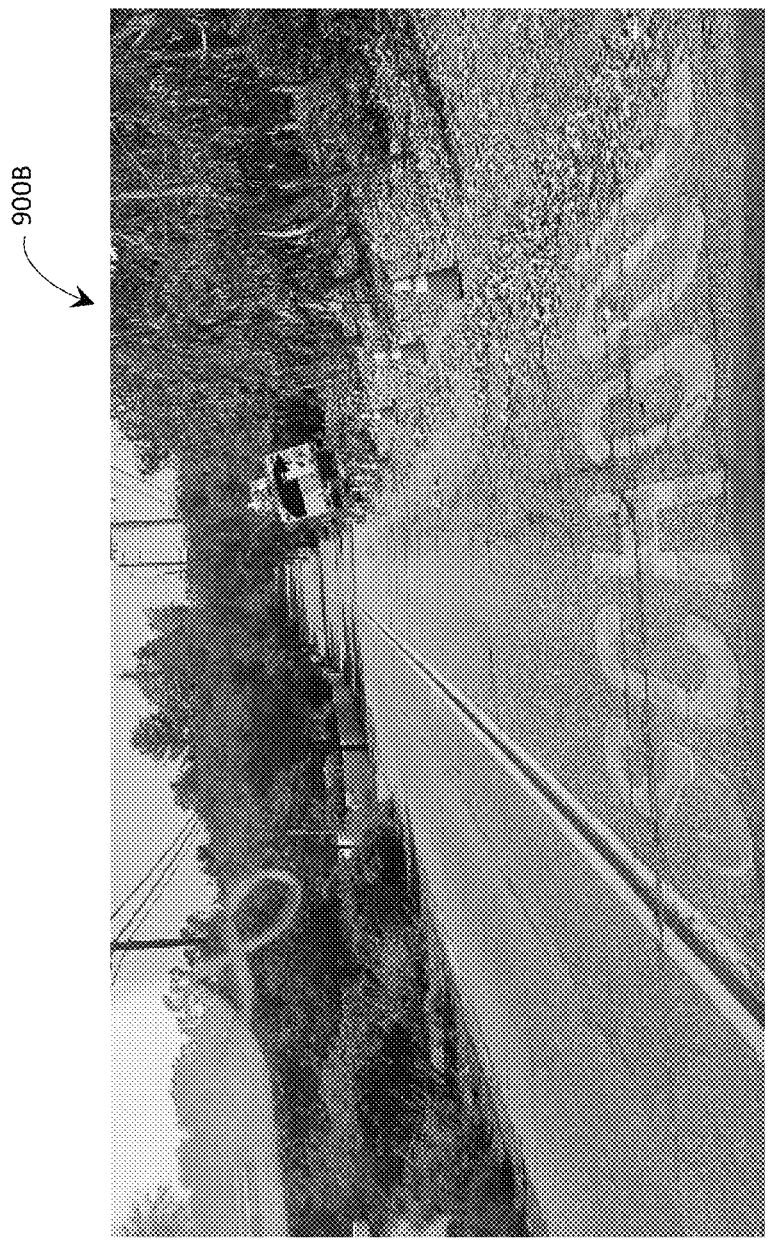
Figure 9C:
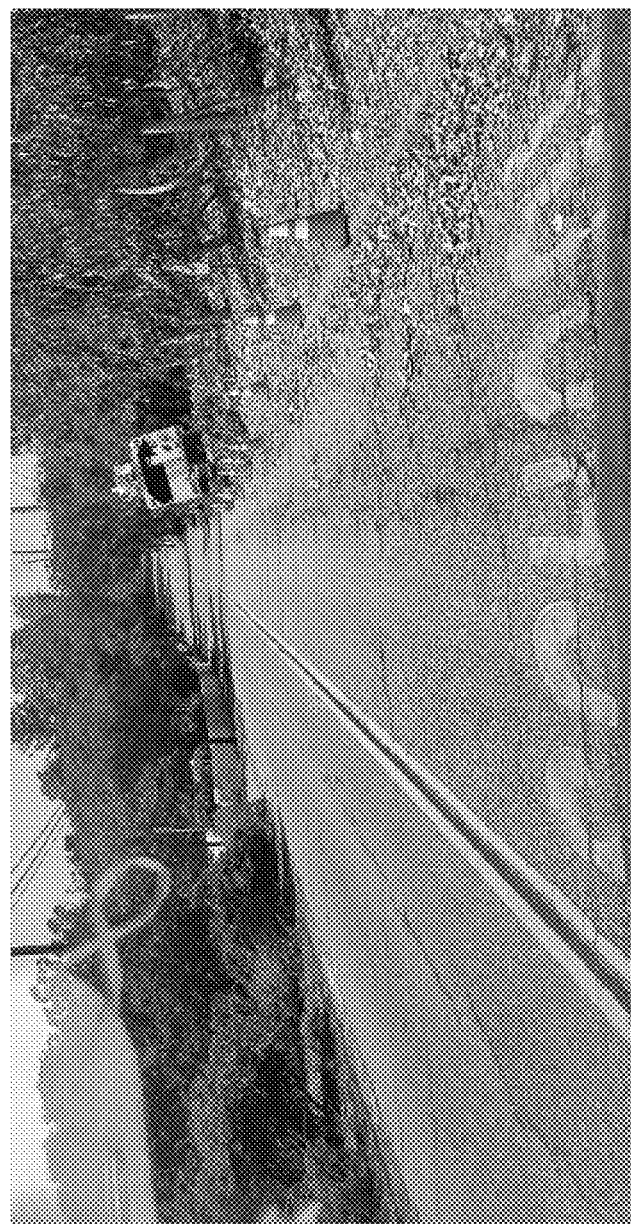
Figure 9D:
FIGS. 9D-F show, respectively, illustrative synthetic top-view images 900D-F, in accordance with some embodiments.
Figure 9E:
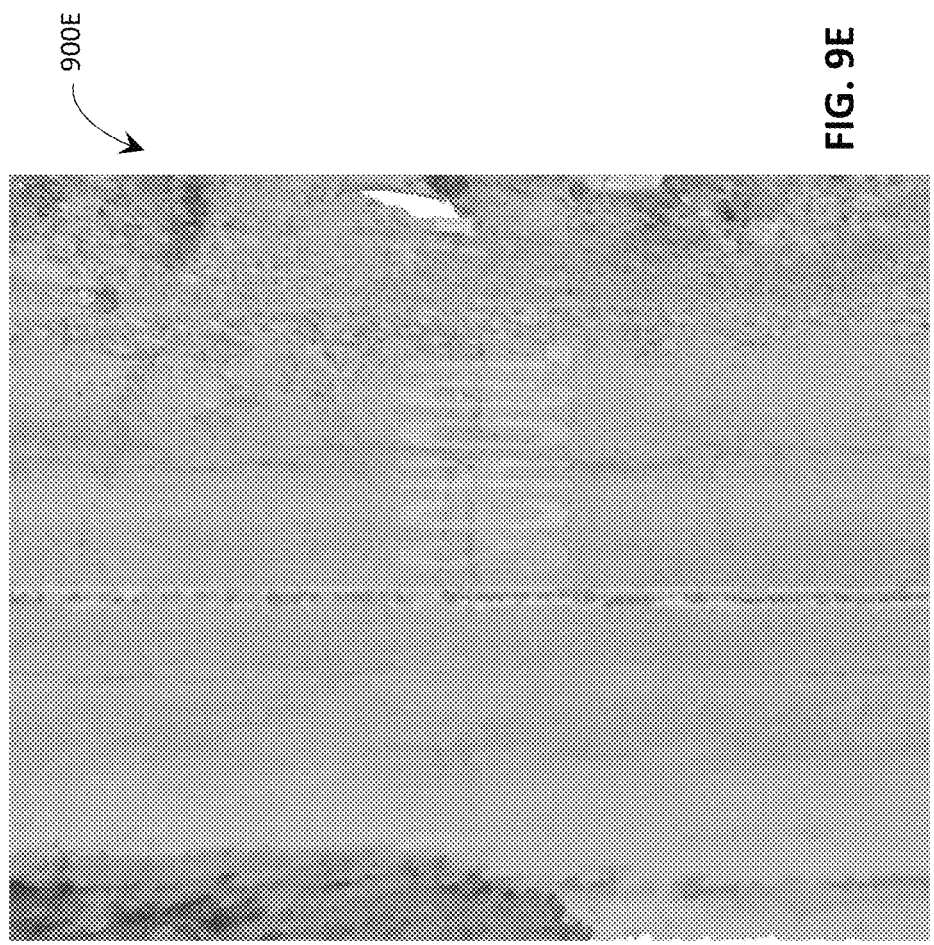
Figure 9F:
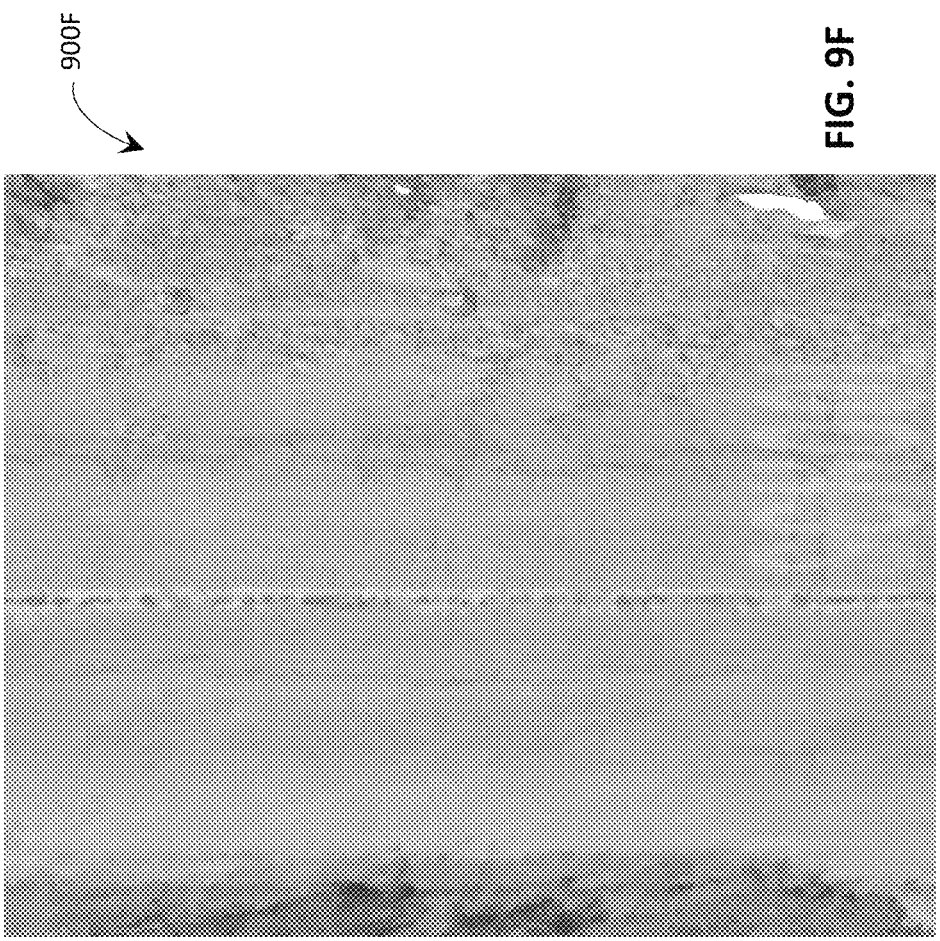

FIGS. 9A-C show, respectively, illustrative actual driver-view images 900A-C taken along a road segment, in accordance with some embodiments. FIGS. 9D-F show, respectively, illustrative synthetic top-view images 900D-F, in accordance with some embodiments. The synthetic images 900D-F may be generated using a video stream from which the actual images 900A-C are sampled.

Thus, top-view images may be provided, without using an overhead camera. The inventors have recognized and appreciated that top-view images may reduce apparent differences introduced by changes in perspective, and therefore may improve assessment accuracy. However, it should be appreciated that aspects of the present disclosure are not limited to using synthetic images of any particular view, or any synthetic image at all.

In some embodiments, the synthetic images 800C-D may be generated using a 3D point cloud, and one or more points in the point cloud may be associated with geospatial information (e.g., latitude, longitude, and/or altitude). Thus, each of the synthetic images 800C-D may have a camera pose that is georeferenced (e.g., with a georeferenced camera position).

The inventors have recognized and appreciated that a georeferenced camera pose may be used to provide more a meaningful comparison across different data collection trips. For instance, images from an earlier data collection trip may be used to construct a first point cloud, while images from a later data collection trip may be used to construct a second point cloud. A first synthetic image of a pavement surface may be generated from the first point cloud, and a second synthetic image of the pavement surface may be generated from the second point cloud, both using the same georeferenced camera pose. In this manner, a comparison between the first and second images may accurately reveal how the pavement surface has changed between the two data collect trips.

In some embodiments, a sequence of camera poses may be used to generate, respectively, a sequence of synthetic images. The camera poses may be regularly spaced along a road segment (e.g., one per meter, 2 meters, 3 meters, 4 meters, 5 meters, etc.), while maintaining the same height and orientation relative to the road segment. Additionally, or alternatively, each synthetic image may show a selected length of the road segment (e.g., 1 meter, 2 meters, 3 meters, 4 meters, 5 meters, etc.). For instance, the first synthetic image may show a first 3-meter interval, the second synthetic image may show a second 3-meter interval, etc., with little or no overlap between consecutive images. In this manner, double counting of damage may be reduced.

Although the inventors have recognized and appreciated various advantages of using georeferenced 3D models to analyze infrastructure assets, it should be appreciated that aspects of the present disclosure are not so limited. In some embodiments, a 3D model may be used that does not have any associated geospatial information.

Illustrative configurations of various aspects of the present disclosure are provided below.

A1. A computer-implemented method comprising acts of: analyzing sensor data to detect at least one infrastructure asset, wherein the sensor data is associated with geospatial metadata; and using the geospatial metadata associated with the sensor data to geolocate the at least one infrastructure asset.

A2. The method of configuration A1, wherein: the sensor data comprises a plurality of images captured by a moving camera.

A3. The method of configuration A2, wherein: geolocating the at least one infrastructure asset comprises: using the plurality of images to generate a point cloud, wherein one or more points in the point cloud correspond to the at least one infrastructure asset; and geolocating the at least one infrastructure asset based on coordinates of the one or more points corresponding to the at least one infrastructure asset.

A4. The method of configuration A2, wherein: geolocating the at least one infrastructure asset comprises: for at least one image of the plurality of images, estimating a camera position relative to the at least one infrastructure asset; and geolocating the at least one infrastructure asset based on the estimated camera position relative to the at least one infrastructure asset.

A5. The method of configuration A4, wherein: the geospatial metadata associated with the sensor data comprises GPS coordinates for the at least one image; and the method further comprises using the estimated camera position to correct the GPS coordinates for the at least one image.

A6. The method of configuration A1, wherein: analyzing the sensor data comprises applying a segmentation model to at least first and second images of the plurality of images; the segmentation model labels one or more first pixels of the first image as corresponding to the at least one infrastructure asset; and the segmentation model labels one or more second pixels of the second image as corresponding to the at least one infrastructure asset.

A7. The method of configuration A5, wherein: geolocating the at least one infrastructure asset comprises tracking the one or more first pixels and the one or more second pixels.

B1. A computer-implemented method comprising acts of: using a plurality of images captured by a moving camera to generate a point cloud; identifying a plurality of points in the point cloud, wherein the plurality of points have surface normals that are within a selected threshold of vertical; and reconstructing a surface based on the plurality of points.

B2. The method of configuration B1, wherein: the camera is attached to a moving vehicle; and the reconstructed surface represents road pavement on which the vehicle is traveling.

B3. The method of configuration B2, wherein: the method comprises analyzing the reconstructed surface to assess a condition of the road pavement.

C1. A computer-implemented method comprising acts of: assessing a condition of at least one infrastructure asset, at least in part by analyzing sensor data collected from the at least one infrastructure asset.

C2. The method of configuration C1, wherein: the at least one infrastructure asset comprises at least one sign.

C3. The method of configuration C2, wherein: the sensor data comprises a plurality of images captured by a moving camera.

C4. The method of configuration C2, wherein: assessing a condition of the at least one sign comprises: using the plurality of images to generate a point cloud, wherein one or more points in the point cloud correspond to the at least one sign; and using the point cloud to assess visibility of the at least one sign.

D1. A computer-implemented method comprising acts of: analyzing sensor data collected from at least one geographic area; and determining, based at least in part on the sensor data, at least one infrastructure asset that was present in previously collected data, but is missing in the sensor data.

D2. The method of configuration D1, wherein: analyzing the sensor data comprises detecting a first plurality of infrastructure assets from the sensor data; and determining the at least one missing infrastructure asset comprises: looking up, from an inventory of infrastructure assets, a second plurality of infrastructure assets associated with the at least one geographic area; and comparing the first plurality of infrastructure assets and the second plurality of infrastructure assets.

E1. A computer-implemented method comprising acts of: using a plurality of images captured by a moving camera to generate a point cloud; identifying, from the point cloud, a plurality of points corresponding to a pavement surface; using the plurality of points to generate at least one synthetic image of the pavement surface, the at least one synthetic image having at least one selected camera pose; and using the at least one synthetic image to assess at least one condition of the pavement surface.

E2. The method of configuration E1, wherein: identifying a plurality of points corresponding to a pavement surface comprises identifying a plurality of points having surface normals that are within a selected threshold of vertical.

E3. The method of configuration E1, wherein: identifying a plurality of points corresponding to a pavement surface comprises identifying a plurality of points having pixel colors that match one or more selected pavement colors.

E4. The method of configuration E1, wherein: the point cloud is georeferenced based on geospatial metadata associated with the plurality of images; and the selected camera pose comprises a selected georeferenced position.

E5. The method of configuration E1, wherein: the pavement surface comprises a pavement surface of a road segment; the at least one synthetic image comprises a plurality of synthetic images; the at least one selected camera pose comprises a plurality of selected camera poses distributed along the road segment, the plurality of selected camera poses having a same height and a same orientation relative to the road segment.

E6. The method of configuration E5, wherein: the pavement surface comprises a plurality of non-overlapping intervals; and each synthetic image of the plurality of synthetic images shows a respective interval of the plurality of non-overlapping intervals.

E7. The method of configuration E1, further comprising acts of: estimating a motion of the camera; and sampling, based on the estimated motion of the camera, from a video stream captured by the camera, the plurality of images used to generate the point cloud.

E8. The method of configuration E7, wherein: the video stream is sampled at a first frequency in response to determining that the estimated motion of the camera includes rotational motion; and the video stream is sampled at a second frequency in response to determining that the estimated motion of the camera does not include rotational motion, wherein the second frequency is lower than the first frequency.

F1. A computer-implemented method comprising acts of: analyzing sensor data to detect at least one infrastructure asset, wherein: the sensor data comprises a plurality of images captured by a moving camera; and the at least one infrastructure asset comprises at least one sign; using the plurality of images to generate a point cloud, wherein the point cloud is georeferenced based on geospatial metadata associated with the plurality of images; identifying, from the point cloud, one or more points corresponding to the at least one sign; and using coordinates of the one or more points in the point cloud to associate geospatial information with the at least one sign.

F2. The method of configuration F1, further comprising an act of: applying at least one machine learning model to at least one image of the plurality of images, wherein: the at least one machine learning model labels one or more pixels in the at least one image as corresponding to the at least one sign; and the one or more points corresponding to the at least one sign are identified based on the one or more pixels corresponding to the at least one sign.

F3. The method of configuration F2, wherein: the at least one image comprises first and second images; the at least one machine learning model labels one or more first pixels of the first image as corresponding to the at least one sign; the at least one machine learning model further labels one or more second pixels of the second image as corresponding to the at least one sign; and the point cloud is generated at least in part by tracking the at least one sign from the first image to the second image.

F4. The method of configuration F1, further comprising acts of: using the point cloud to estimate a camera position for at least one image of the plurality of images; and using the estimated camera position to correct the geospatial metadata associated with the at least one image.

F5. The method of configuration F1, further comprising an act of: using the point cloud to determine whether the at least one sign is obscured by another object when viewed from a selected camera pose.

F6. The method of configuration F1, further comprising acts of: determining whether the at least one sign matches an entry in an inventory of signs; in response to determining that the at least one sign does not match an entry in the inventory of signs, adding an entry to the inventory of signs, the entry storing information regarding the at least one sign; and in response to determining that the at least one sign matches an entry in the inventory of signs, determining whether to update the matching entry.

F7. The method of configuration F6, wherein: the at least one sign comprises a first sign; the plurality of images are captured from at least one geographic area; and the method further comprises an act of: determining whether the inventory of signs comprises an entry for a second sign that is associated with the at least one geographic area, but is not detected from the plurality of images.

F8. The method of configuration F1, wherein: the plurality of images comprises a first image and a second image; analyzing sensor data to detect at least one infrastructure asset comprises: identifying, from the first image, a first plurality of pixels corresponding to a first instance of a selected signage type; and identifying, from the second image, a second plurality of pixels corresponding to a second instance of the selected signage type; and identifying one or more points corresponding to the at least one sign comprises: mapping the first plurality of pixels to a first plurality of points in the point cloud; mapping the second plurality of pixels to a second plurality of points in the point cloud; determining an extent of overlap between the first and second pluralities of points; and in response to determining that the extent of overlap exceeds a selected threshold, merging the first and second pluralities of points.

F9. The method of configuration F8, wherein: determining an extent of overlap between the first and second pluralities of points comprises: determining a first convex hull of the first plurality of points; determining a second convex hull of the second plurality of points; and determining an extent of overlap between the first and second convex hulls.

G1. A system comprising: at least one processor; and at least one computer-readable storage medium having stored thereon instructions which, when executed, program the at least one processor to perform any of the methods described herein.

H1. At least one computer-readable storage medium having stored thereon instructions which, when executed, program at least one processor to perform any of the methods described herein.

FIG. 10 shows, schematically, an illustrative computer 1000 on which any aspect of the present disclosure may be implemented.

In the example of FIG. 10, the computer 1000 includes a processing unit 1001 having one or more computer hardware processors and one or more articles of manufacture that comprise at least one non-transitory computer-readable medium (e.g., memory 1002) that may include, for example, volatile and/or non-volatile memory. The memory 1002 may store one or more instructions to program the processing unit 1001 to perform any of the functions described herein. The computer 1000 may also include other types of non-transitory computer-readable media, such as storage 1005 (e.g., one or more disk drives) in addition to the memory 1002. The storage 1005 may also store one or more application programs and/or resources used by application programs (e.g., software libraries), which may be loaded into the memory 1002. To perform any of the illustrative functionalities described herein, processing unit 1001 may execute one or more processor-executable instructions stored in the one or more non-transitory computer-readable media (e.g., the memory 1002, the storage 1005, etc.), which may serve as non-transitory computer-readable media storing processor-executable instructions for execution by the processing unit 1001.

The computer 1000 may have one or more input devices and/or output devices, such as devices 1006 and 1007 illustrated in FIG. 10. These devices may be used, for instance, to present a user interface. Examples of output devices that may be used to provide a user interface include printers, display screens, and other devices for visual output, speakers and other devices for audible output, braille displays and other devices for haptic output, etc. Examples of input devices that may be used for a user interface include keyboards, pointing devices (e.g., mice, touch pads, and digitizing tablets), microphones, etc. For instance, the input devices 1007 may include a microphone for capturing audio signals, and the output devices 1006 may include a display screen for visually rendering, and/or a speaker for audibly rendering, recognized text.

In the example of FIG. 10, the computer 1000 also includes one or more network interfaces (e.g., the network interface 1010) to enable communication via various networks (e.g., the network 1020). Examples of networks include local area networks (e.g., an enterprise network), wide area networks (e.g., the Internet), etc. Such networks may be based on any suitable technology operating according to any suitable protocol, and may include wireless networks and/or wired networks (e.g., fiber optic networks).

Having thus described several aspects of at least one embodiment, it is to be appreciated that various alterations, modifications, and improvements will readily occur to those skilled in the art. Such alterations, modifications, and improvements are intended to be within the spirit and scope of the present disclosure. Accordingly, the foregoing descriptions and drawings are by way of example only.

The above-described embodiments of the present disclosure can be implemented in any of numerous ways. For example, the embodiments may be implemented using hardware, software, or a combination thereof. When implemented in software, the software code may be executed on any suitable processor or collection of processors, whether provided in a single computer or distributed among multiple computers.

Also, the various methods or processes outlined herein may be coded as software that is executable on one or more processors running any one of a variety of operating systems or platforms. Such software may be written using any of a number of suitable programming languages and/or programming tools, including scripting languages and/or scripting tools. In some instances, such software may be compiled as executable machine language code or intermediate code that is executed on a framework or virtual machine. Additionally, or alternatively, such software may be interpreted.

The techniques disclosed herein may be embodied as a non-transitory computer-readable medium (or multiple non-transitory computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more processors, perform methods that implement the various embodiments of the present disclosure discussed above. The computer-readable medium or media may be portable, such that the program or programs stored thereon may be loaded onto one or more different computers or other processors to implement various aspects of the present disclosure as discussed above.

The terms "program" or "software" are used herein to refer to any type of computer code or plurality of computer-executable instructions that may be employed to program one or more processors to implement various aspects of the present disclosure as discussed above. Moreover, it should be appreciated that according to one aspect of this embodiment, one or more computer programs that, when executed, perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Program modules may include routines, programs, objects, components, data structures, etc. that perform particular tasks or implement particular abstract data types. Functionalities of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields to locations in a computer-readable medium that convey how the fields are related. However, any suitable mechanism may be used to relate information in fields of a data structure, including through the use of pointers, tags, or other mechanisms that establish how the data elements are related.

Various features and aspects of the present disclosure may be used alone, in any combination of two or more, or in a variety of arrangements not specifically discussed in the embodiments described in the foregoing, and are therefore not limited to the details and arrangement of components set forth in the foregoing description or illustrated in the drawings. For example, aspects described in one embodiment may be combined in any manner with aspects described in other embodiments.

Also, the techniques disclosed herein may be embodied as methods, of which examples have been provided. The acts performed as part of a method may be ordered in any suitable way. Accordingly, embodiments may be constructed in which acts are performed in an order different from illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," "based on," "according to," "encoding," and variations thereof herein, is meant to encompass the items listed thereafter and equivalents thereof as well as additional items.

What is claimed is:

1. A computer-implemented method comprising acts of:
   analyzing sensor data to detect at least one infrastructure asset, wherein:

the sensor data comprises a plurality of images captured by a moving camera, the plurality of images comprising a first image and a second image;
the at least one infrastructure asset comprises at least one sign; and
analyzing sensor data to detect at least one infrastructure asset comprises:
identifying, from the first image, a first plurality of pixels corresponding to a first instance of a selected signage type; and
identifying, from the second image, a second plurality of pixels corresponding to a second instance of the selected signage type; and
using the plurality of images to generate a point cloud, wherein the point cloud is georeferenced based on geospatial metadata associated with the plurality of images;
identifying, from the point cloud, one or more points corresponding to the at least one sign, comprising:
mapping the first plurality of pixels to a first plurality of points in the point cloud;
mapping the second plurality of pixels to a second plurality of points in the point cloud;
determining an extent of overlap between the first and second pluralities of points; and
in response to determining that the extent of overlap exceeds a selected threshold, merging the first and second pluralities of points; and
using coordinates of the one or more points in the point cloud to associate geospatial information with the at least one sign.

2. The method of claim 1, wherein:
determining an extent of overlap between the first and second pluralities of points comprises:
determining a first convex hull of the first plurality of points;
determining a second convex hull of the second plurality of points; and
determining an extent of overlap between the first and second convex hulls.

3. The method of claim 1, further comprising an act of:
applying at least one machine learning model to at least one image of the plurality of images, wherein:
the at least one machine learning model labels one or more pixels in the at least one image with the selected signage type; and
the one or more points corresponding to the at least one sign are identified based on the one or more pixels labeled with the selected signage type.

4. The method of claim 3, wherein:
the at least one image comprises the first and second images;
the at least one machine learning model labels the first plurality of pixels of the first image with the selected signage type;
the at least one machine learning model further labels the second plurality of pixels of the second image with the selected signage type; and
the point cloud is generated at least in part by tracking the at least one sign from the first image to the second image.

5. The method of claim 1, further comprising acts of:
using the point cloud to estimate a camera position for at least one image of the plurality of images; and
using the estimated camera position to correct the geospatial metadata associated with the at least one image.

6. The method of claim 1, further comprising an act of:
using the point cloud to determine whether the at least one sign is obscured by another object when viewed from a selected camera pose.

7. The method of claim 1, further comprising acts of:
determining whether the at least one sign matches an entry in an inventory of signs;
in response to determining that the at least one sign does not match an entry in the inventory of signs, adding an entry to the inventory of signs, the entry storing information regarding the at least one sign; and
in response to determining that the at least one sign matches an entry in the inventory of signs, determining whether to update the matching entry.

8. The method of claim 7, wherein:
the at least one sign comprises a first sign;
the plurality of images are captured from at least one geographic area; and
the method further comprises an act of:
determining whether the inventory of signs comprises an entry for a second sign that is associated with the at least one geographic area, but is not detected from the plurality of images.

9. A system comprising:
at least one processor; and
at least one computer-readable storage medium having stored thereon instructions which, when executed, program the at least one processor to analyze sensor data to detect at least one infrastructure asset, wherein:
the sensor data comprises a plurality of images captured by a moving camera, the plurality of images comprising a first image and a second image;
the at least one infrastructure asset comprises at least one sign; and
the at least one processor is programmed by the instructions to:
identify, from the first image, a first plurality of pixels corresponding to a first instance of a selected signage type; and
identify, from the second image, a second plurality of pixels corresponding to a second instance of the selected signage type; and
use the plurality of images to generate a point cloud, wherein the point cloud is georeferenced based on geospatial metadata associated with the plurality of images;
identify, from the point cloud, one or more points corresponding to the at least one sign, at least in part by:
mapping the first plurality of pixels to a first plurality of points in the point cloud;
mapping the second plurality of pixels to a second plurality of points in the point cloud;
determining an extent of overlap between the first and second pluralities of points; and
in response to determining that the extent of overlap exceeds a selected threshold, merging the first and second pluralities of points; and
use coordinates of the one or more points in the point cloud to associate geospatial information with the at least one sign.

10. The system of claim 9, wherein:
determining an extent of overlap between the first and second pluralities of points comprises:
determining a first convex hull of the first plurality of points;

determining a second convex hull of the second plurality of points; and determining an extent of overlap between the first and second convex hulls.

11. The system of claim 9, wherein:

the instructions further program the at least one processor to apply at least one machine learning model to at least one image of the plurality of images;

the at least one machine learning model labels one or more pixels in the at least one image with the selected signage type; and the instructions program the at least one processor to identify the one or more points corresponding to the at least one sign based on the one or more pixels labeled with the selected signage type.

12. The system of claim 11, wherein:

the at least one image comprises the first and second images;

the at least one machine learning model labels the first plurality of pixels of the first image with the selected signage type;

the at least one machine learning model further labels the second plurality of pixels of the second image with the selected signage type; and the instructions further program the at least one processor to generate the point cloud at least in part by tracking the at least one sign from the first image to the second image.

13. The system of claim 9, wherein the instructions further program the at least one processor to:

use the point cloud to estimate a camera position for at least one image of the plurality of images; and use the estimated camera position to correct the geospatial metadata associated with the at least one image.

14. The system of claim 9, wherein the instructions further program the at least one processor to:

use the point cloud to determine whether the at least one sign is obscured by another object when viewed from a selected camera pose.

15. The system of claim 9, wherein the instructions further program the at least one processor to:

determine whether the at least one sign matches an entry in an inventory of signs;

in response to determining that the at least one sign does not match an entry in the inventory of signs, add an entry to the inventory of signs, the entry storing information regarding the at least one sign; and in response to determining that the at least one sign matches an entry in the inventory of signs, determine whether to update the matching entry.

16. The system of claim 15, wherein:

the at least one sign comprises a first sign;

the plurality of images are captured from at least one geographic area; and the instructions further program the at least one processor to:

determine whether the inventory of signs comprises an entry for a second sign that is associated with the at least one geographic area, but is not detected from the plurality of images.

17. At least one non-transitory computer-readable storage medium having stored thereon instructions which, when executed, program at least one processor to:

analyze sensor data to detect at least one infrastructure asset, wherein:

the sensor data comprises a plurality of images captured by a moving camera, the plurality of images comprising a first image and a second image;

the at least one infrastructure asset comprises at least one sign; and the instructions program the at least one processor to:

identify, from the first image, a first plurality of pixels corresponding to a first instance of a selected signage type; and identify, from the second image, a second plurality of pixels corresponding to a second instance of the selected signage type; and use the plurality of images to generate a point cloud, wherein the point cloud is georeferenced based on geospatial metadata associated with the plurality of images;

identify, from the point cloud, one or more points corresponding to the at least one sign, at least in part by:

mapping the first plurality of pixels to a first plurality of points in the point cloud;

mapping the second plurality of pixels to a second plurality of points in the point cloud;

determining an extent of overlap between the first and second pluralities of points; and in response to determining that the extent of overlap exceeds a selected threshold, merging the first and second pluralities of points; and use coordinates of the one or more points in the point cloud to associate geospatial information with the at least one sign.

18. The at least one non-transitory computer-readable storage medium of claim 17, wherein:

determining an extent of overlap between the first and second pluralities of points comprises:

determining a first convex hull of the first plurality of points;

determining a second convex hull of the second plurality of points; and determining an extent of overlap between the first and second convex hulls.

19. The at least one non-transitory computer-readable storage medium of claim 17, wherein:

the instructions further program the at least one processor to apply at least one machine learning model to at least one image of the plurality of images;

the at least one machine learning model labels one or more pixels in the at least one image with the selected signage type; and the instructions program the at least one processor to identify the one or more points corresponding to the at least one sign based on the one or more pixels labeled with the selected signage type.

20. The at least one non-transitory computer-readable storage medium of claim 19, wherein:

the at least one image comprises the first and second images;

the at least one machine learning model labels the first plurality of pixels of the first image with the selected signage type;

the at least one machine learning model further labels the second plurality of pixels of the second image with the selected signage type; and the instructions further program the at least one processor to generate the point cloud at least in part by tracking the at least one sign from the first image to the second image.

21. The at least one non-transitory computer-readable storage medium of claim 17, wherein the instructions further program the at least one processor to:
use the point cloud to estimate a camera position for at least one image of the plurality of images; and
use the estimated camera position to correct the geospatial metadata associated with the at least one image.

22. The at least one non-transitory computer-readable storage medium of claim 17, wherein the instructions further program the at least one processor to:
use the point cloud to determine whether the at least one sign is obscured by another object when viewed from a selected camera pose.

23. The at least one non-transitory computer-readable storage medium of claim 16, wherein the instructions further program the at least one processor to:
determine whether the at least one sign matches an entry in an inventory of signs;
in response to determining that the at least one sign does not match an entry in the inventory of signs, add an entry to the inventory of signs, the entry storing information regarding the at least one sign; and
in response to determining that the at least one sign matches an entry in the inventory of signs, determine whether to update the matching entry.

24. The at least one non-transitory computer-readable storage medium of claim 23, wherein:
the at least one sign comprises a first sign;
the plurality of images are captured from at least one geographic area; and
the instructions further program the at least one processor to:
determine whether the inventory of signs comprises an entry for a second sign that is associated with the at least one geographic area, but is not detected from the plurality of images.

* * * * *